United States Patent
Twigg et al.

(10) Patent No.: US 10,803,616 B1
(45) Date of Patent: Oct. 13, 2020

(54) HAND CALIBRATION USING SINGLE DEPTH CAMERA

(71) Applicant: Facebook Technologies, LLC, Menlo Park, CA (US)

(72) Inventors: Christopher David Twigg, San Francisco, CA (US); Robert Y. Wang, Kirkland, WA (US); Yuting Ye, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 133 days.

(21) Appl. No.: 15/487,361

(22) Filed: Apr. 13, 2017

(51) Int. Cl.
*G06T 7/73* (2017.01)
*G06K 9/00* (2006.01)
*G06F 3/01* (2006.01)

(52) U.S. Cl.
CPC .............. *G06T 7/75* (2017.01); *G06F 3/017* (2013.01); *G06K 9/00355* (2013.01); *G06K 9/00389* (2013.01); *G06T 2207/10028* (2013.01); *G06T 2207/20084* (2013.01); *G06T 2207/30196* (2013.01)

(58) Field of Classification Search
CPC ............. G06T 7/75; G06T 2207/10028; G06T 2207/20084; G06T 2207/30196; G06K 9/00355; G06K 9/00389; G06K 9/00201; G06K 9/2063; G06K 9/209; G06K 9/6256; G06K 9/78; G06F 3/011; G06F 3/017
See application file for complete search history.

(56) References Cited

U.S. PATENT DOCUMENTS

| | | | |
|---|---|---|---|
| 9,679,197 B1* | 6/2017 | Sills | G06F 3/017 |
| 2009/0080780 A1* | 3/2009 | Ikeda | G06K 9/00369 |
| | | | 382/209 |
| 2011/0175802 A1* | 7/2011 | Hsieh | G06K 9/00389 |
| | | | 345/156 |

(Continued)

OTHER PUBLICATIONS

Ge et al., "Robust 3D Hand Pose Estimation in Single Depth Images: from Single-View CNN to Multi-View CNN", Jun. 2016, IEEE, Confernce on Computer Vision and Pattern Recognition, p. 3593-3601.*

(Continued)

*Primary Examiner* — Vincent Rudolph
*Assistant Examiner* — Timothy Choi
(74) *Attorney, Agent, or Firm* — Fenwick & West LLP

(57) ABSTRACT

A system generates a user hand shape model from a single depth camera. The system includes the single depth camera and a hand tracking unit. The single depth camera generates single depth image data of a user's hand. The hand tracking unit applies the single depth image data to a neural network model to generate heat maps indicating locations of hand features. The locations of hand features are used to generate a user hand shape model customized to the size and shape of the user's hand. The user hand shape model is defined by a set of principle component hand shapes defining a hand shape variation space. The limited number of principle component hand shape models reduces determination of user hand shape to a smaller number of variables, and thus provides for a fast calibration of the user hand shape model.

21 Claims, 18 Drawing Sheets
(9 of 18 Drawing Sheet(s) Filed in Color)

(56) References Cited

U.S. PATENT DOCUMENTS

2017/0185141 A1* 6/2017 Shotton .................. G06F 3/011
2019/0043199 A1* 2/2019 Zhao ........................ G06T 7/62

OTHER PUBLICATIONS

Schroder et al., "Real-Time Hand Tracking using Synergistic Inverse Kinematics", Jun. 2014, IEEE, Int. Conf. on Robotics and Automation, p. 5447-5454.*
Tagliasacchi et al., "Robust Articulated-ICP for Real-Time Hand Tracking", Aug. 2015, Wiley, Computer Graphics forum, vol. 34, iss. 5, p. 101-114.*
Heap et al., "Towards 3D Hand Tracking using a Deformable Model", Oct. 1996, IEEE, Proceedings of the 2nd Int. Conf. on Automatic Face and Gesture Recognition, p. 140-145.*
Gallo et al., "Hand shape classification using depth data for unconstrained 3D interaction", Jan. 2014, IOS Press, Journal of Ambient Intelligence and Smart Environments vol. 6, iss. 1, p. 93-105. (Year: 2014).*

* cited by examiner

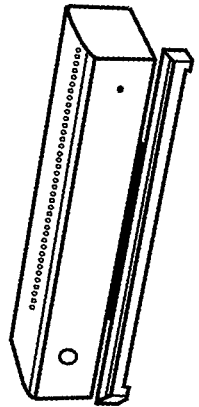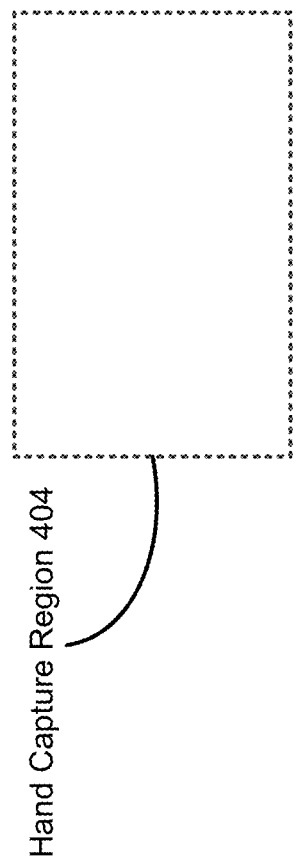
FIG. 4

900

Generate image data sets by imaging devices, each image data set including a pose of a user's hand from multiple perspectives captured by the imaging devices
910

Generate input hand shapes of poses of the user's hand based on the image data sets
920

Determine a base hand shape model defining hand features and associated degrees of freedom for the hand features
930

Update the base hand shape model based on fitting vertices of the base hand shape model to corresponding vertices of the input hand shapes
940

Determine a user hand shape model based on the updated base hand shape model
950

```
┌─────────────────────────────────────────────────────────────────────┐
│ Receive depth image data including a user's hand from a single depth camera │
│                                1410                                 │
└─────────────────────────────────────────────────────────────────────┘
                                    │
                                    ▼
┌─────────────────────────────────────────────────────────────────────┐
│ Determine a user hand shape model defining degrees of freedom for hand │
│       features and relative locations of the hand features          │
│                                1420                                 │
└─────────────────────────────────────────────────────────────────────┘
                                    │
                                    ▼
┌─────────────────────────────────────────────────────────────────────┐
│ Determine, based on applying the depth image data to a neural network model, │
│           heat maps indicating locations of hand features            │
│                                1430                                 │
└─────────────────────────────────────────────────────────────────────┘
                                    │
                                    ▼
┌─────────────────────────────────────────────────────────────────────┐
│ Determine a pose of the user's hand based on fitting the locations of the hand │
│ features to the degrees of freedom for the hand features defined by user hand │
│                             shape model                             │
│                                1440                                 │
└─────────────────────────────────────────────────────────────────────┘
                                    │
                                    ▼
┌─────────────────────────────────────────────────────────────────────┐
│     Determine a user input based on the second pose of the user's hand │
│                                1450                                 │
└─────────────────────────────────────────────────────────────────────┘
                                    │
                                    ▼
┌─────────────────────────────────────────────────────────────────────┐
│  Render an image of the user's hand based on the hand pose and the user hand │
│                             shape model                             │
│                                1460                                 │
└─────────────────────────────────────────────────────────────────────┘
```

```
Determine hand features of a hand shape model
1610
          ↓
Determine locations of the hand features from image data sets received from
imaging devices, each image data set including a pose of the user's hand from
multiple perspectives captured by the imaging devices
1620
          ↓
Generate first training data including the image data sets and the locations of
hand features
1630
          ↓
Train a neural network with the first training data to generate a neural network
model, wherein the neural network model defines an algorithmic relationship
between image data and the locations of the hand features
1640
          ↓
Determine locations of hand features from single depth image data received
from a single depth camera
1650
          ↓
Generate second training data including the single depth image data and the
locations of hand features
1660
          ↓
Train the neural network with the second training data to update the neural
network model
1670
```

```
┌─────────────────────────────────────────────────────────────┐
│ Generate single depth image data including a user's hand    │
│ captured from a single depth camera                          │
│ 1710                                                         │
└─────────────────────────────────────────────────────────────┘
                              │
                              ▼
┌─────────────────────────────────────────────────────────────┐
│ Determine, based on applying the single depth image data to │
│ a neural network model, heat maps indicating locations of   │
│ hand features of a hand shape model                         │
│ 1720                                                         │
└─────────────────────────────────────────────────────────────┘
                              │
                              ▼
┌─────────────────────────────────────────────────────────────┐
│ Determine a hand pose based on the location of the hand     │
│ features                                                     │
│ 1730                                                         │
└─────────────────────────────────────────────────────────────┘
                              │
                              ▼
┌─────────────────────────────────────────────────────────────┐
│ Determine an input hand shape model based on the hand pose  │
│ 1740                                                         │
└─────────────────────────────────────────────────────────────┘
                              │
                              ▼
┌─────────────────────────────────────────────────────────────┐
│ Determine a set of principal component hand shape models    │
│ 1750                                                         │
└─────────────────────────────────────────────────────────────┘
                              │
                              ▼
┌─────────────────────────────────────────────────────────────┐
│ Determine a user hand shape model based on fitting one or   │
│ more input hand shape models to the set of principal        │
│ component hand shape models                                 │
│ 1760                                                         │
└─────────────────────────────────────────────────────────────┘
```

FIG. 17

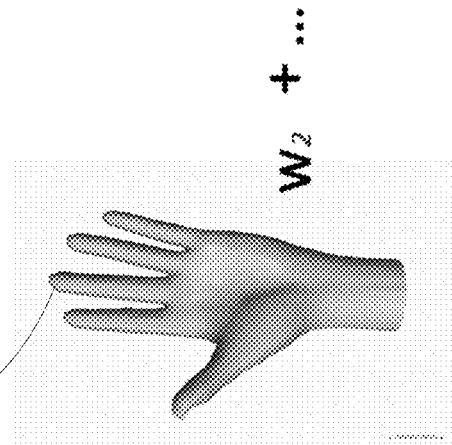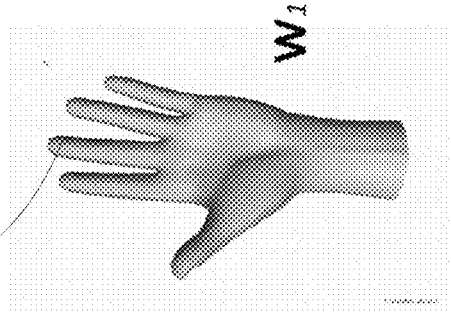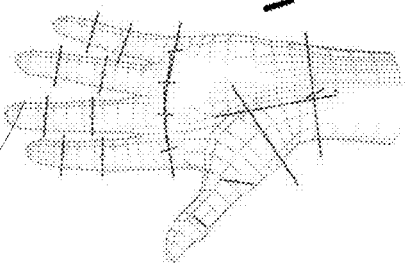
FIG. 19

HAND CALIBRATION USING SINGLE DEPTH CAMERA

BACKGROUND

Hand tracking refers to the process of detecting the poses of a user's hand. For example, cameras can be set up to capture images of the user's hand. The images may be processed to determine a hand pose, which may be used as an input to for a computing device. The speed and accuracy of the programmatic hand pose analysis from images depends on various factors, such as the ability to recognize variations in hand size and shape across different users. It is desirable to provide highly accurate hand model calibration and hand pose identification from images, while reducing computational time and hardware requirements.

SUMMARY

Techniques for generating a user hand shape model for hand tracking are discussed herein. A user hand shape model customized for a user is generated as a set of principal component hand shape models, such as a weighted combination of ten principal component hand shape models. Each principal component hand shape model may control a linearly uncorrelated parameter of user hand shape. The use of a limited number of principal component hand shape models reduces determination of user hand shape to a smaller number of variables, and thus provides for a fast calibration of the user hand shape model.

The system may include a hand tracking unit that receives depth image data including a user's hand from a single depth camera. The hand tracking unit includes a neural network that, using the depth image data, generates probable locations for various hand features on a user's hand, which is used to determine a hand pose of the user's hand. The neural network may be a convolutional neural network. The hand tracking unit performs an optimization that relates the hand pose to a user hand shape model defining the shape of the user's hand. The limited number of principal component hand shape models provide for a limited number of variables for a rapid determination of hand shape. The user hand shape model can be used to facilitate subsequent determination of hand poses from depth image data.

Some embodiments may include a system, comprising a single depth camera and a hand tracking unit. The single depth camera generates single depth image data of a user's hand. The hand tracking unit receives the single depth image data of the user's hand from the single depth camera, and determines based on applying the single depth image data to a neural network model, heat maps indicating locations of hand features. A hand pose is determined based on the location of the hand features, and an input hand shape model is determined based on the hand pose. A set of principal component hand shape models is determined, and a user hand shape model is determined based on fitting the input hand shape model to the set of principal component hand shape models.

In some embodiments, the user hand shape model may include a combination of the set of principal component hand shape models. For example, the user hand shape model may be defined as a weighted combination of the principal component hand shape models.

Some embodiments may include a device including a hand tracking unit. The device may be a head-mounted display (HMD), or a console attached with a HMD. The hand tracking unit receives single depth image data of a user's hand from a single depth camera, and determines, based on applying the single depth image data to a neural network model, heat maps indicating locations of hand features. A hand pose is determined based on the location of the hand features, and an input hand shape model is determined based on the hand pose. A set of principal component hand shape models is determined, and a user hand shape model is determined based on fitting the input hand shape model to the set of principal component hand shape models.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is an example of a single camera imaging system, in accordance with some embodiments.

FIG. 9 is a flow chart illustrating a process for generating a user hand shape model, in accordance with some embodiments.

FIG. 14 is a flow chart illustrating a process for user hand tracking, in accordance with some embodiments.

FIG. 16 is a flow chart illustrating a process for generating a neural network model, in accordance with some embodiments.

FIG. 17 is a flow chart illustrating a process for generating a user hand shape model, in accordance with some embodiments.

FIG. 19 shows examples of principal component hand shape models, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
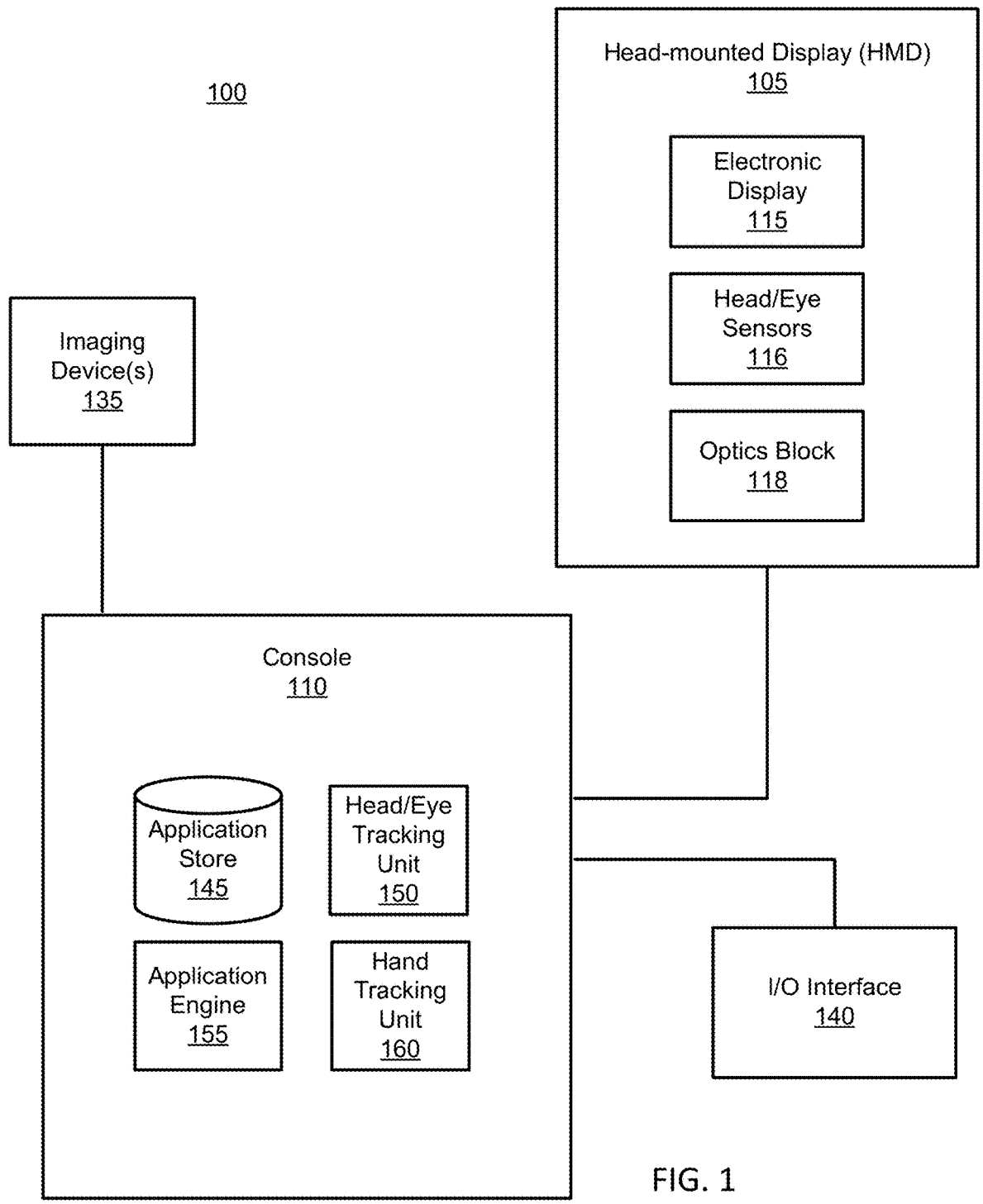
FIG. 1 is a block diagram of a head-mounted display system, in accordance with some embodiments.

FIG. 1 is a block diagram of a head-mounted display (HMD) system 100 in accordance some embodiment. The HMD system 100 operates in virtual reality (VR), augmented reality (AR), and/or mixed reality (MR) environments. The system 100 shown in FIG. 1 comprises a head-mounted display (HMD) 105, one or more imaging devices 135, and an input/output (I/O) interface 140 that are each coupled to a console 110. While FIG. 1 shows an example system 100 including one HMD 105, one imaging device 135, and one I/O interface 140, in other embodiments, any number of these components are included in the system 100. For example, system 100 may include multiple HMDs 105 each having an associated I/O interface 140 and being monitored by one or more imaging devices 135, with each HMD 105, I/O interface 140, and imaging device 135 communicating with the console 110. In alternative configurations, different and/or additional components may be included in the system 100.

The HMD 105 presents content to a user. Examples of content presented by the HMD 105 include one or more images, video, audio, or some combination thereof. In some embodiments, audio is presented via an external device (e.g., speakers and/or headphones) that receives audio information from the HMD 105, the console 110, or both, and presents audio data based on the audio information. In one example, the HMD 105 comprises one or more rigid bodies, which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The HMD 105 includes an electronic display 115, head/eye sensors 116, and optics block 118. The head/eye sensors 116 are configured to detect the position of the user's head and/or eyes. For example, the head/eye sensors 116 may include one or more cameras that capture images of the user's eyes, and/or one or more position sensors that capture the position of the user's head (e.g., accelerometer). Various types of sensors can be used. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light from the electronic display 115, corrects optical errors associated with the image light, and presents the corrected image light to a user of the HMD 105. In an embodiment, the optics block 118 includes one or more optical elements and/or combinations of different optical elements. For example, an optical element is an aperture, a Fresnel lens, a convex lens, a concave lens, a filter, or any other suitable optical element that affects the image light emitted from the electronic display 115. In some embodiments, one or more of the optical elements in the optics block 118 may have one or more coatings, such as anti-reflective coatings.

Figure 3:
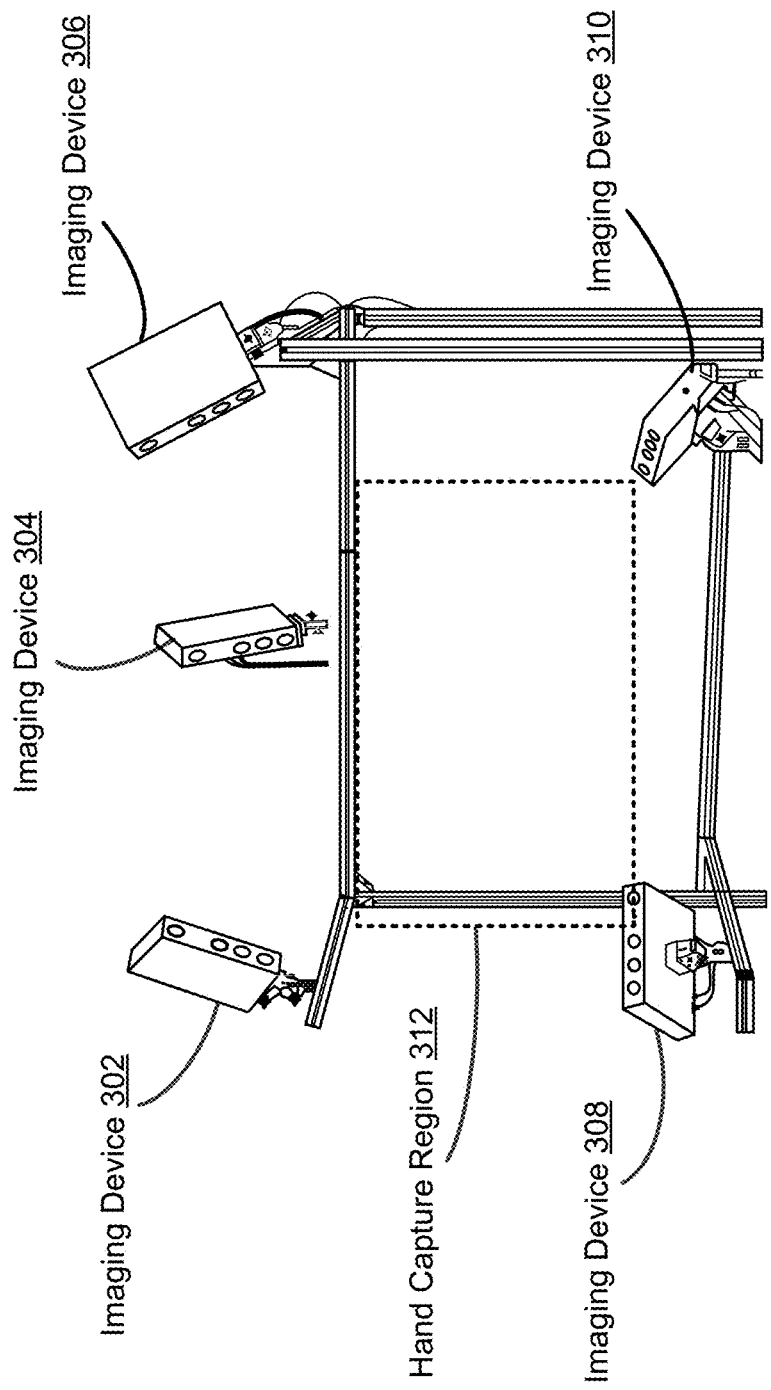
FIG. 3 is an example of a multi-camera imaging system, in accordance with some embodiments.

The one or more imaging devices 135 are configured to generate image data of a user's hand to facilitate user hand tracking. In various embodiments, the system 100 may include one or more imaging devices 135. For example, the system 100 may include multiple (e.g., 5) imaging devices 135 of a multi-camera imaging system are pointed at a hand capture region in space from a different perspective as shown in FIG. 3. The imaging devices 135 are configured to generate image data sets, where each image data set includes a pose of a user's multiple perspectives as captured by the imaging devices 135. In another example, the system 100 may include a single camera imaging system, such as a single depth camera that generates depth image data as shown in FIG. 4.

In some embodiments, the imaging devices 135 may include one or more depth cameras. A depth camera may include a light sensor, a structured light (e.g., infrared) emitter, and a controller. The structured light emitter projects a light pattern into the hand capture region, and onto the user's hand when the user's hand is within the hand capture region. The light pattern, for example, may include a known speckle pattern. The light (e.g., infrared) sensor is pointed at the hand capture region, and captures the projected light pattern on the user's hand. The controller controls the operations of the light sensor and structured light emitter. The controller is further configured to generate depth image data based on input from the light sensor.

In some embodiments, one or more imaging devices 135 are attached to the HMD 105. For example, an imaging device 135 may be pointed to the front of the HMD 105 to capture a first person perspective of the user. When the user's hand is within the field of view, the imaging device 135 captures image data of the user's hand from a first person perspective. The imaging device on the HMD 105 may be a single depth camera of a single camera imaging system, or may be a camera of a multi-camera imaging system. For the multi-camera imaging system, image data from the imaging device 135 on the HMD 105 may be included in image data sets with image data from the other imaging devices 135 located elsewhere.

The I/O interface 140 is a device that allows a user to send action requests to the console 110. An action request is a request to perform a particular action. For example, an action request may be to start or end an application or to perform a particular action within the application. The I/O input interface 140 may include one or more input devices. Example input devices include: a keyboard, a mouse, a game controller, electronic gloves, or any other suitable device for receiving action requests and communicating the received action requests to the console 110. An action request received by the I/O interface 140 is communicated to the console 110, which performs an action corresponding to the action request. In some embodiments, the I/O input interface 140 may provide haptic feedback to the user in accordance with instructions received from the console 110. For example, haptic feedback is provided when an action request is received, or the console 110 communicates instructions to the I/O input interface 140 causing the I/O input interface 140 to generate haptic feedback when the console 110 performs an action.

The HMD system 100 uses one or more imaging devices 135 to capture image data of the user's hands. The hand tracking unit 160 derives hand poses from the image data, and the hand poses are used as inputs to the console 110. For example, different hand poses are associated with different action requests. User hand tracking may be used in connection with one or more input devices of the I/O interface 140. In some embodiments, the I/O interface 140 is omitted from the system 100.

The console 110 provides content to the HMD 105 for presentation to a user in accordance with information received from one or more of: the imaging device 135, the HMD 105, and the I/O interface 140. In the example shown in FIG. 1, the console 110 includes an application store 145, a head/eye tracking unit 150, an application engine 155, and a hand tracking unit 160. Some embodiments of the console 110 have different modules than those described in conjunction with FIG. 1. Similarly, the functions further described below may be distributed among components of the console 110 in a different manner than is described here. For example, the hand tracking unit 160 may be located in the HMD 105.

Figure 5:
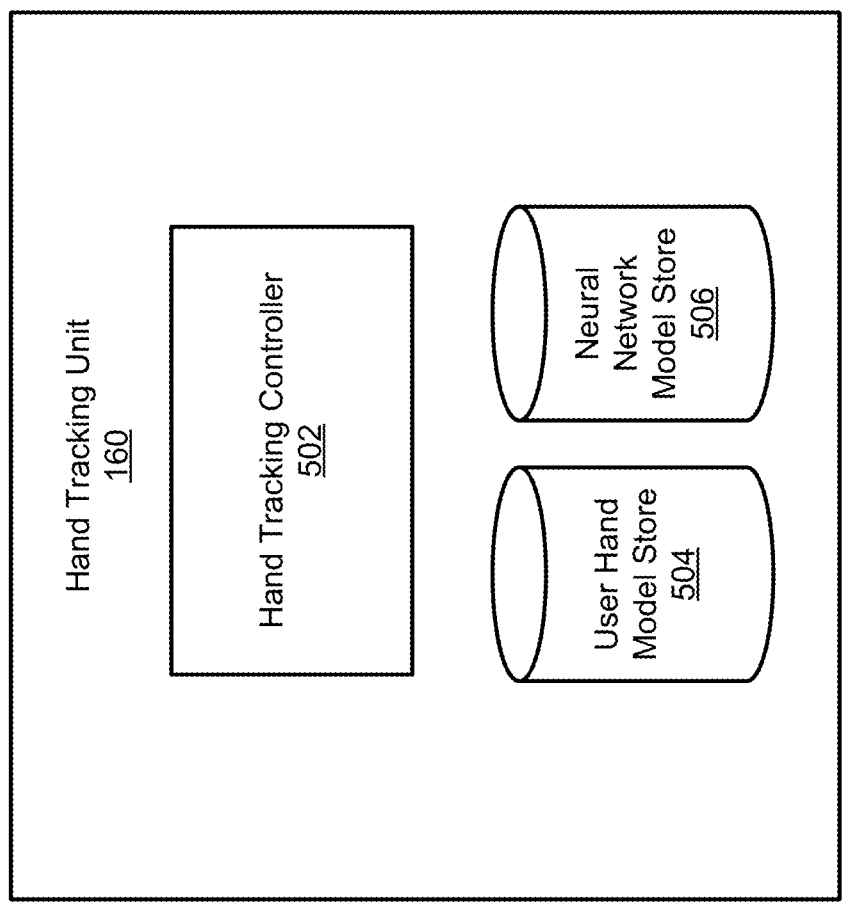
FIG. 5 is a block diagram of a hand tracking unit, in accordance with some embodiments.
Figure 6:
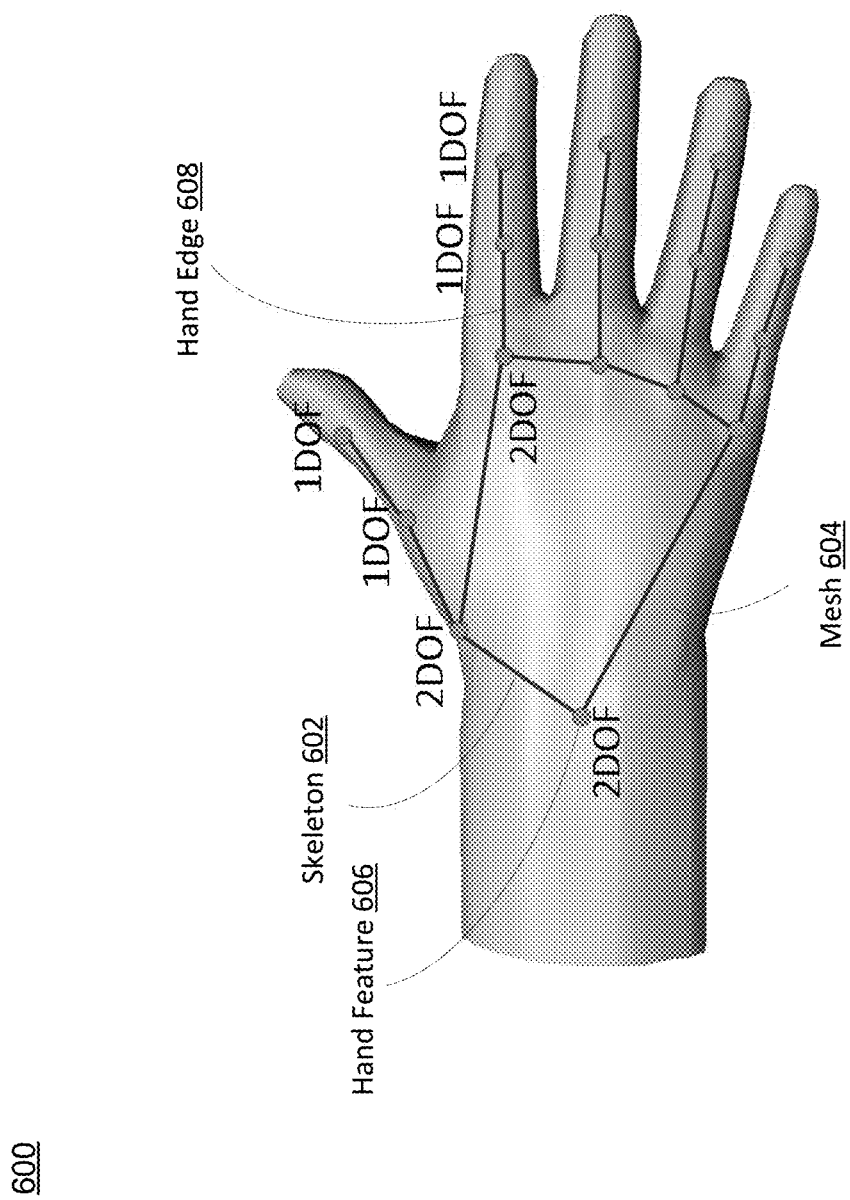
FIG. 6 is an example of a hand shape model, in accordance with some embodiments.

The hand tracking unit 160, which may include a hand tracking controller as discussed in greater detail below in connection with FIG. 5, determines a user hand shape model (e.g., as shown in FIG. 6) and poses of the user's hand based on image data captured by the imaging device(s) 135. The hand tracking unit 160 includes a neural network, such as a convolutional neural network, that generates heat maps indicating probable locations of hand features by using a neural network model. The hand tracking unit 160 determines the pose of the user's hand based on the heat maps and the user hand shape model. The hand tracking unit 160 may be further configured to create and/or update the neural network model, such as by using training data created by the imaging device(s) 135.

The application store 145 stores one or more applications for execution by the console 110. An application is a group of instructions, that when executed by a processor, generates content for presentation to the user. Content generated by an application may be in response to inputs received from the user via movement of the HMD 105 or the I/O interface device 140. Examples of applications include: gaming applications, conferencing applications, video playback application, or other suitable applications. The head/eye tracking unit 150 communicates with the head/eye sensors 116 of the HMD 105, and determines the positions of the user's head and eyes. In some embodiments, head/eye tracking unit 150 calibrates the system 100 using one or more calibration parameters and may adjust one or more calibration parameters to reduce error in determination of the head or eye positions of the HMD 105. The head/eye tracking unit 150 provides the head or eye positions to the application engine 155.

The application engine 155 executes applications within the system 100. The application engine 155 may receive user hand pose inputs from the hand tracking unit 160, as well as head and/or eye position inputs from the head/eye tracking unit 150. Based on the received information, the application engine 155 determines content to provide to the HMD 105 for presentation to the user. Additionally, the application engine 155 performs an action within an application executing on the console 110 in response to an action request received from the I/O interface 140 and provides feedback to the user that the action was performed. For example, the provided feedback includes visual or audible feedback via the HMD 105 or haptic feedback via the I/O interface 140.

Figure 2:
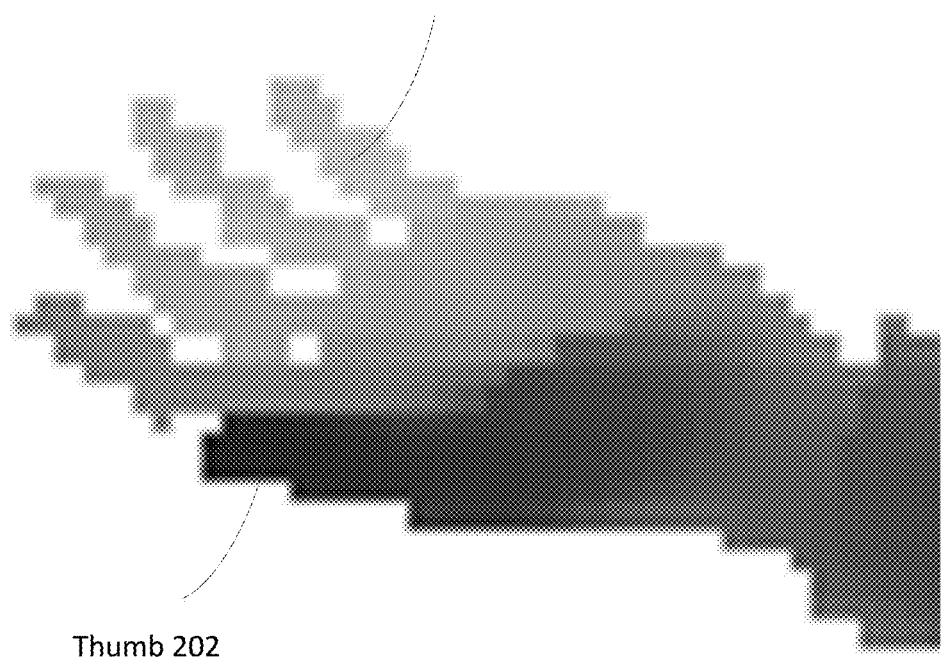
FIG. 2 is an example of depth image data, in accordance with some embodiments.

FIG. 2 is an example of depth image data 200, in accordance with some embodiments. The depth image data 200 is generated by a single depth camera, which is an example of an imaging device 135. The depth image data 200 defines a depth map. The depth map is an image indicating the distance of the objects captured in the image from the viewpoint of the of the single depth camera. The depth map data 200 includes pixels (e.g., distinct points) representing a user's hand, where the pixels are illuminated with different brightness based on distance from the single depth camera. For example, the user's thumb 202 is closer than the user's pinky finger 204, and thus the pixels corresponding with the user's thumb 202 are darker than pixels corresponding with the user's pinky finger 204. In another example, pixels representing closer objects are brighter than pixels representing further away objects. Here, the depth map data 200 includes grayscale tonal change as a function of depth. In yet another example, a depth map uses different colors to represent different depths. The location of pixels corresponding with the hand, along with the depth of the pixels, is used to determine the user's hand shape and pose. As discussed in greater detail below, a neural network is used to identify locations of hand features in 3-dimensional space based on depth image data, and the user's hand shape and pose are then determined based on the locations of the hand features.

FIG. 3 is an example of multi-camera imaging system 300, in accordance with some embodiments. The multi-camera imaging system 300 is an example embodiment of imaging devices 135 that can be incorporated in the system 100. The multi-camera imaging system 300 includes multiple imaging devices, such as imaging devices 302, 304, 306, 308, and 310. The imaging devices 304-310 are pointed at a hand capture region 312, where the user's hands are located for hand tracking. Each imaging device 304-310 is pointed at the hand capture region 312 from a different direction to capture image data of the user's hand(s) from multiple perspectives. In some embodiments, at least one imaging device of the multi-camera system 300 is located on the HMD 105.

In some embodiments, the imaging devices 304-310 are depth cameras. In another embodiment, the imaging devices 304-310 are RGB cameras. The individual images captured by RGB cameras do not provide depth information like depth map image data 200, but the RBG cameras generally cost less than depth cameras. Put another way, a depth camera provides 3-dimensional information about a pixel's location (e.g., with depth being the Z axis), while a single RGB camera provides 2-dimensional (e.g., X, Y) location but not depth. Color image data from multiple RGB cameras may be cross referenced to more reliably determine the 3-dimensional location of hand features.

The imaging devices 304-310 may be synchronized (e.g., with timestamps and/or a shared clock) to capture image data sets, where each image data set includes an image of the user's hand in a particular pose. As such, the imaging devices 304-310 captures image data sets of the user's hands in different poses and from multiple perspectives. The images from multiple perspectives provide high quality information regarding hand shapes and poses because hand features that are occluded from one perspective may be visible from another perspective. Although the multi-camera imaging system 300 shown in FIG. 3 includes five imaging devices, a multi-camera imaging system may include two or more imaging devices in various embodiments.

The use of multiple imaging devices allows for efficient image data gathering because a user's hand can be in many different positions, poses, and orientations with respect to a fixed viewpoint. Various portions of the hand may also be occluded from a single viewpoint, but visible from other viewpoints. Hand features across multiple images may be associated to facilitate creation of a user hand shape model that is accurately customized to the user. For example, each image data set includes images of the user's hand in a particular pose from multiple perspectives, which is used to generate an input hand shape model. Multiple input hand shape models of the user's hand in different poses are generated from image data sets. The user hand shape model is generated by fitting a base hand shape model to the input hand shape models generated from multiple image data sets. Generating the user hand shape model from input hand shape models may include using a sparse QR decomposition. After a user hand shape model is generated, the user hand shape model is applied to recognizing poses from hand feature locations identified from image data by a neural network. The image data sets from multiple imaging devices may be used as training data for training the neural network.

In some embodiments, multiple imaging devices 304-310 are used to generate image data sets of the user's hands in different poses. The poses may include a representative sample of commonly used (e.g., finger point, thumb up, peace sign, etc.), distinctive, and/or useful (e.g., for providing particular instruction inputs to an application) gestures. In some embodiments, the image data sets may further include poses of hands of multiple sizes and shapes. These image data sets are generated across multiple users, and may be used to create training data for training the neural network to determine probable locations of hand features from image data. The trained neural network recognizes hand features for hands of multiple sizes and shapes, and in different poses from image data FIG. 4 is an example of a single camera system 400, in accordance with some embodiments. The single camera imaging system 400 is an example embodiment of an imaging device 135 that can be incorporated in the system 100. The single camera imaging system 400 includes a single imaging device 402 which is pointed at a hand capture region 404 where the user's hands are located for hand tracking. The imaging device 402 is a single depth camera (e.g., infrared camera) that generates single depth image data, such as the depth image data 200 shown in FIG. 2. The single depth image data generated by the imaging device 402 is from a single perspective, and thus may include lower quality information regarding hand shapes and poses than multiple perspective image data sets (e.g., depending on hand pose, position, hand feature occlusion, etc.). However, it is advantageous to use fewer cameras for hand tracking to reduce hardware costs, improve space efficiency, optimize resource utilization, etc. As discussed in greater detail below, a neural network model may be trained to determine user hand shapes and poses from single depth image data captured by the single camera imaging system 400. In some embodiments, the imaging device 402 of the single camera imaging system 400 is located on the HMD 105.

FIG. 5 is a block diagram of the hand tracking unit 160, in accordance with some embodiments. Some embodiments of the hand tracking unit 160 have different components than those described here. Similarly, the functions can be distributed among the components in a different manner than is described here. For example, the hand tracking unit 160 may be located in the HMD 105, or other computing device. The hand tracking unit 160 includes a hand tracking controller 502, a user hand model store 504, and a neural network model store 506. In some embodiments, the user hand model store 504 and neural network model store 506 combined as a single model store.

The hand tracking controller 502 is configured to determine a user hand shape model and poses of the user's hand. The hand tracking controller user 502 receives image data captured by the imaging device(s) 135 and uses the image data to determine the pose of the user's hand. The user hand model store 504 stores the user hand shape model. The hand tracking controller 502 includes a neural network, such as a convolutional neural network. The hand tracking controller 502 generates heat maps indicating locations of hand features by using a neural network model stored in the neural network model store 506. The locations of hand features, along with the user hand model, are used by the hand tracking controller 502 to determine the pose. The hand tracking controller 502 may be further configured to create and/or update the neural network model, such as by using training data created by the imaging device 135.

FIG. 6 is an example of a hand shape model 600, in accordance with some embodiments. The hand shape model 600 defines a deformable shape and size of a hand. For example, hand shape model 600 includes a skeleton 602 and a mesh 604. The skeleton 602 includes hand features 606, representing nodes of the skeleton. At least some hand features 606 have fixed distances between other hand features 606, which is shown by the hand edges 608 of the skeleton 602. The hand edges 608 are models for bones of the hand, and the hand features 606 are models for joints that connect the bones.

Each hand feature 606 is associated with one or more degrees of freedom (DOF) defining the range of motion of the joint. For example, the hand feature at the wrist includes two degrees of freedom (e.g., pitch and yaw). In another example, the hand features at each knuckle include two degrees of freedom (e.g., roll and yaw). In yet another example, the hand features at each finger joint include one degree of freedom (e.g., yaw). Degrees of freedom may include rotational or translational degrees of freedom. Each degree of freedom may be associated with a range of values, such as may be defined by a maximum value and a minimum value, representing how much a joint can move along the degree of freedom. A hand pose is defined by a particular state of the hand shape model 600. For example, a set of values for each degree of freedom of the hand features 606 may define a particular hand pose.

The mesh 604 of the hand shape model 600 defines the surface of the user hand model 600. The mesh 604 may include vertices, where each vertex is attached with a part of the skeleton 602, such as a hand feature 606 or location along a hand edge 608. The vertices when interconnected form a polygon mesh defining a model of the hand surface. For example, a vertex may have a predefined distance from an attached hand feature 606. If a hand feature 606 is moved, the attached vertices move accordingly such that the mesh 604 changes with movement of the skeleton 602. In some embodiments, vertices of the mesh 604 may be attached to more than one location of the skeleton 602. A linear blend skinning may be used where vertices are attached to multiple hand features 606 at different weighting values.

A user hand shape model is a hand shape model that is customized for a particular user. The skeleton and mesh represent the size and shape of the user's hand. A hand pose is defined by a particular state of the user hand shape model. For example, a set of values for each degree of freedom of the hand features of the user hand shape model can define a particular hand pose of the user. In some embodiments, the user hand shape model is generated by manipulating a base hand shape model, and fitting the vertices of the base hand shape model to input hand shape models generated from image data sets of the user's hand in different poses. The locations of the hand features 606 are defined relative to vertices of the mesh, and thus the locations of hand features 606 of the user hand shape model 600 can be calculated based on the changes in vertices of the mesh when the base hand shape model is fit to the input hand shape models.

In some embodiments, a user hand shape model is generated based on principal component hand shape models. As discussed in greater detail below, here the user hand shape model is defined as a weighted linear combination of a set of principal component hand shape models. For example, if a set of ten principal component hand shape models are used, then different user hand shape models for users of different hand size and shape can be represented by 10 weighting values. A principal component analysis of a large number of user hand models (e.g., a representative set) may be used to generate the set of principal component hand shape models. Each principal component hand shape model may control a linearly uncorrelated parameter of user hand shape.

Figure 7:
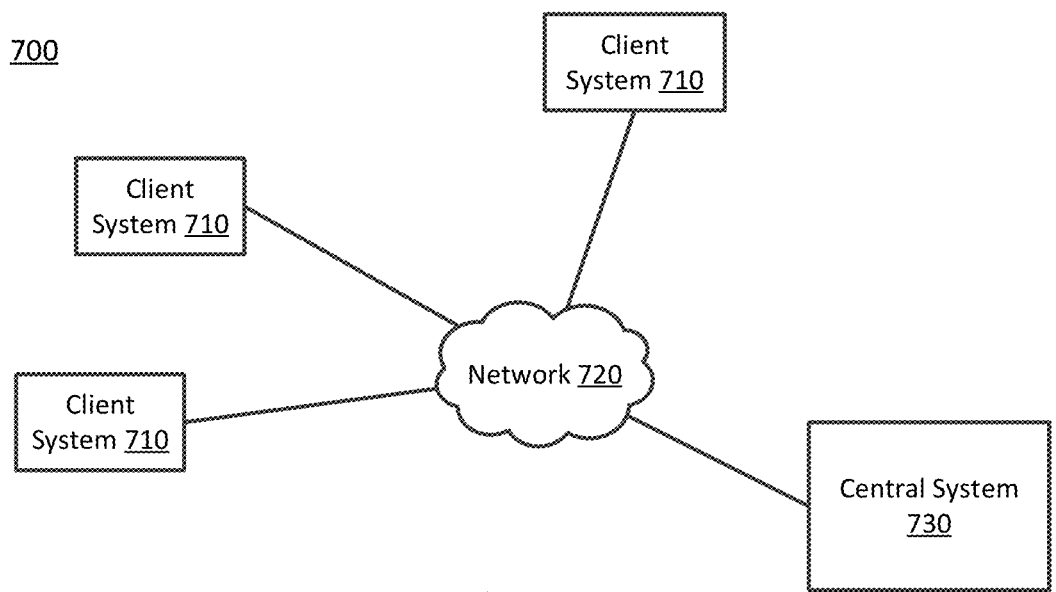
FIG. 7 is a block diagram of a system, in accordance with some embodiments.

FIG. 7 is a block diagram of a system 700, in accordance with some embodiments. The system 700 includes one or more client systems 710, a network 720, and a central system 730. In alternative configurations, different and/or additional components may be included in the system 100. The embodiments described herein can be adapted to online systems, such as social networking systems or networked application (e.g., gaming) systems.

The client systems 710 may include one or more computing devices capable of receiving user input as well as transmitting and/or receiving data via the network 720, as shown in FIG. 1. The client system 710 may include an HMD system 100 shown in FIG. 1. In one embodiment, a console 110 executes an application allowing a user of the console 110 to interact with the central system 730.

The client system 710 is configured to communicate via the network 720, which may comprise any combination of local area and/or wide area networks, using both wired and/or wireless communication systems. In one embodiment, the network 720 uses standard communications technologies and/or protocols. For example, the network 720 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 720 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 720 may be represented using any suitable format, such as hypertext markup language (HTML) or extensible markup language (XML). In some embodiments, all or some of the communication links of the network 720 may be encrypted using any suitable technique or techniques.

Figure 8:
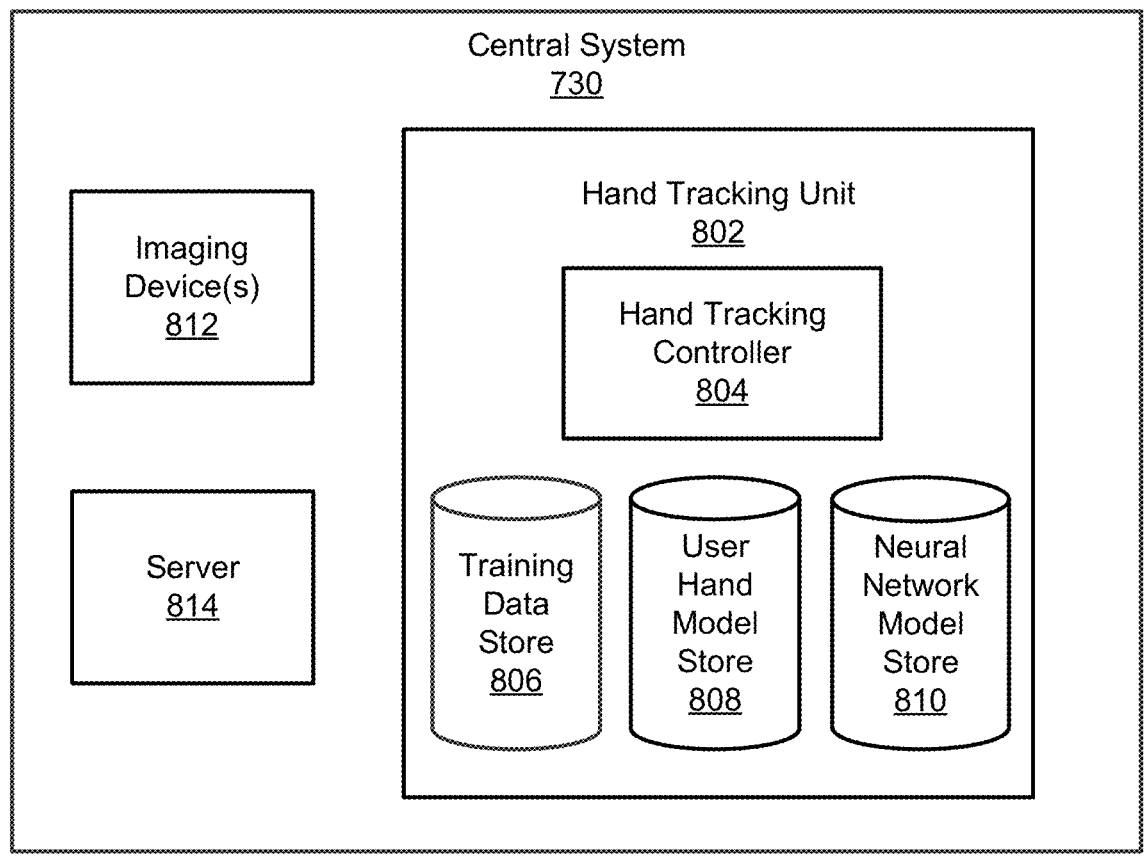
FIG. 8 is a block diagram of architecture of a central system, in accordance with some embodiments.

FIG. 8 is a block diagram of architecture of the central system 730. The central system 730 includes a hand tracking unit 802, one or more imaging devices 812, and a server 814. In other embodiments, the central system 730 may include additional, fewer, or different components for various applications. Conventional components such as network interfaces, security functions, load balancers, failover servers, management and network operations consoles, and the like are not shown so as to not obscure the details of the system architecture.

The hand tracking unit 802 includes a hand tracking controller 804, a training data store 806, a user hand model store 808, and a neural network model store 810. The hand tracking controller 802 is configured to generate a neural network model from training data collected across multiple users. The neural network model defines algorithmic relationships between image data inputs and outputs indicating locations of hand features within the image data. The hand tracking controller 804 may include convolutional neural network architecture. In some embodiments, the hand tracking controller 802 is further configured to perform the functionality discussed herein for the hand tracking controller 502, such as determining user hand shape models and poses from image data.

The training data store 806 stores training data sets used to generate the neural network model. The training data sets may include image data including images of hands, and ground truth outputs defining locations of hand features within the images. A training data set represents a collection of inputs and ground truth outputs that are used to train the neural network model. The training data sets may include depth image data from a single depth camera, or may include image data sets from multiple cameras. The central system 730 may be configured to collect large volumes of image data to generate the training data sets. In some embodiments, the image data used for training data may be collected from client systems 710 via the network 720. In another example, imaging devices 812 may be used to generate image data or image data sets, which are then labeled with ground truth output, and stored as training data within the training data store 806.

The neural network model store 810 stores one or more neural network models. For example, the neural network model store 810 may include a convolutional neural network model that is generated based on applying the training data sets stored in the training data store 806 to a convolutional neural network. The neural network model store 810 may be configured to store a trained neural network model, which may be updated at the central system 730 and pushed out to client systems 710, and stored in the neural network model store 506 of the eye tracking unit 160 shown in FIG. 5.

The server 814 links the central system 730 via the network 720 to the client systems 710. The server 814 may be configured to provide the trained neural network model generated by the hand tracking unit 802 to the client systems 710. The server 814 may be further configured to image data from the client systems 710, which may be collected as training data to train, update, or test the neural network model. The server 814 may also serve web pages, as well as other web-related content, such as JAVA®, FLASH®, XML and so forth.

User Hand Shape Model Creation Using Multiple Imaging Devices

FIG. 9 is a flow chart illustrating a process 900 for generating a user hand shape model, in accordance with some embodiments. The user hand shape model is customized to the size and shape of the user's hands based on image data capture from multiple imaging devices 135 of an HMD system 100, such as the multi-camera imaging system shown in FIG. 3. Process 900 is described as being performed by an HMD system 100, such as at least in part by a hand tracking controller 502 of the hand tracking unit 160 of the console 110. In some embodiments, the hand tracking unit 160 is located at the HMD 105. In other embodiments, the hand tracking unit 802 of the central system 730 performs steps of the process 900. Likewise, embodiments may include different and/or additional steps, or perform the steps in different orders.

The HMD system 100 (e.g., the imaging devices 135) generates 910 image data sets. Each image data set includes a pose of a user's hand from multiple perspectives captured by the imaging devices 135. For example, the HMD system 100 may include the imaging devices 302-310 of the multi-camera system 300 shown in FIG. 3, where each of the imaging devices 302-310 are pointed at the hand capture region 312 from a different direction to capture image data of the user's hand from multiple perspectives. The image data sets include images of the user's hands in different poses. The poses may include a representative sample of gestures or poses. The imaging devices 135 may include RGB cameras, or may include depth cameras. When depth cameras are used, the image data sets include depth image data.

The HMD system 100 (e.g., the hand tracking controller 502) generates 920 input hand shapes of poses of the user's hand based on the image data sets. A hand shape refers to a model of the surface of a hand, and may include vertices and/or a mesh. As discussed below, multiple input hand shapes are used to generate a user hand shape model that defines the size, shape, and possible poses of the hand.

An input hand shape is created for each image data set, where each image data set includes image data of the user's hand in a pose captured from different perspectives. The hand tracking controller 502 is configured to perform a 3-dimensional reconstruction of the user's hand from an image data set.

In some embodiments, the hand tracking controller 502 is configured to map pixels from an image data set to vertices of an associated input hand shape. Generating the input hand shape includes determining corresponding pixels (representing a surface location) of the hand across two or more images of an image data set, and determining a position of the pixel, and determining a position of a corresponding vertex of the input hand shape. The position of the pixels in 3-d space is determined from analysis of corresponding pixels across multiple images of the image data set, such as by using triangulation. In some embodiments, the image data sets include depth image data. The depth image data indicates the depth of surface locations (e.g., based on pixel brightness), and thus may additionally or alternatively be used to inform the mapping of pixels of image data to vertices of the input hand shape in 3-d space. In some embodiments, the HMD system 100 uses fewer imaging devices 300 (e.g., 1, 2, etc.) if the imaging devices are depth cameras, and more imaging devices 300 (e.g., 4, 5, etc.) if the imaging devices are RGB camera.

Figure 10:
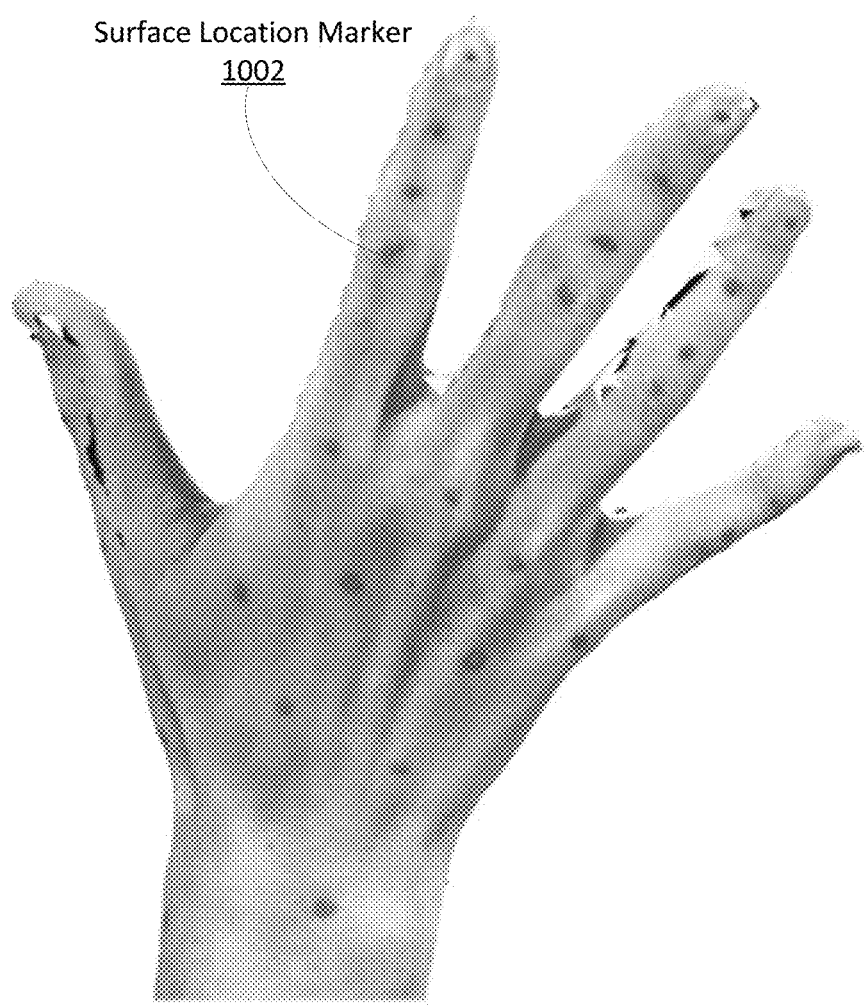
FIG. 10 is an example of image data including surface location markers, in accordance with some embodiments.
Figure 11:
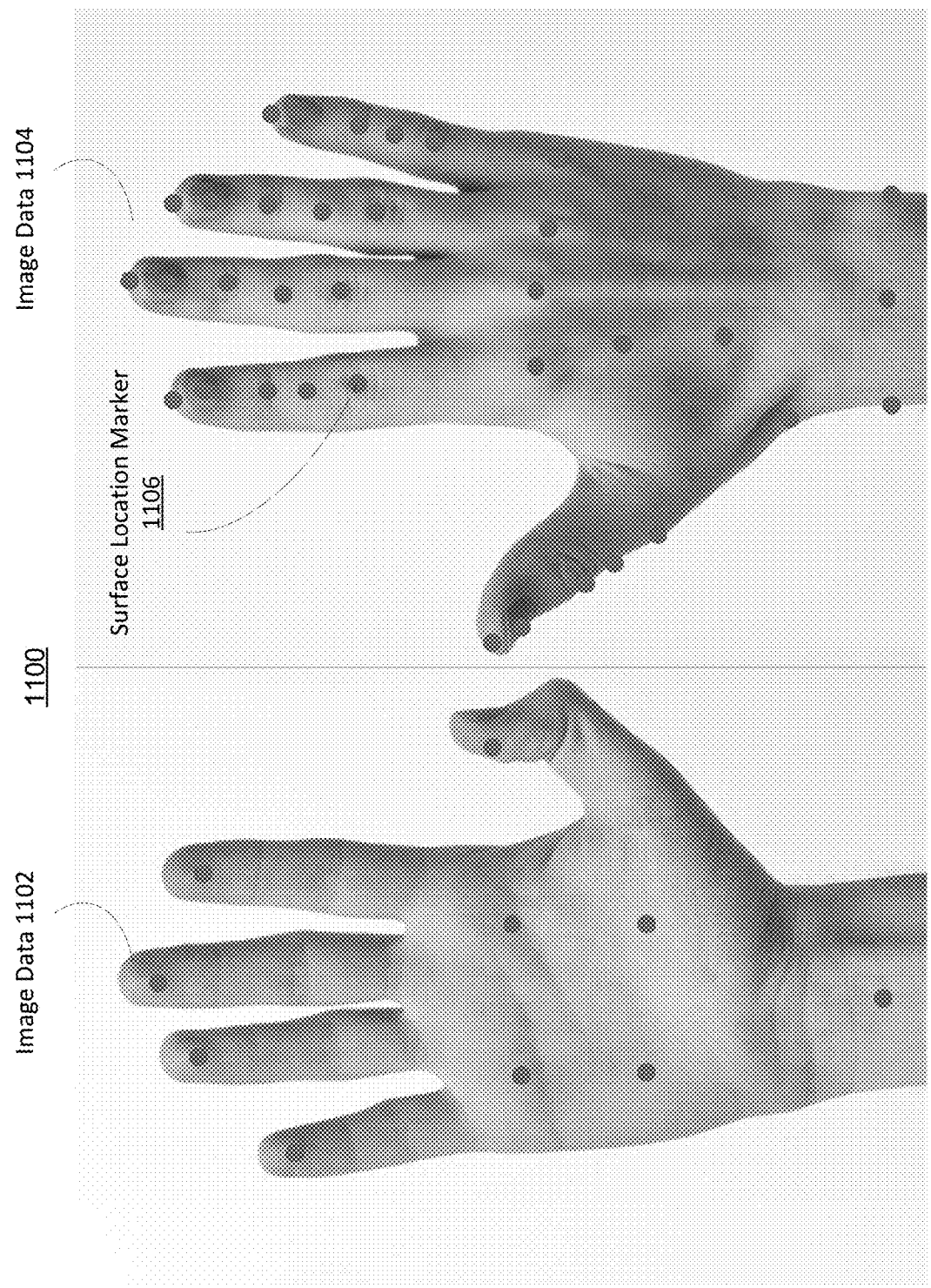
FIG. 11 is an example of image data including surface location markers, in accordance with some embodiments.
Figure 12:
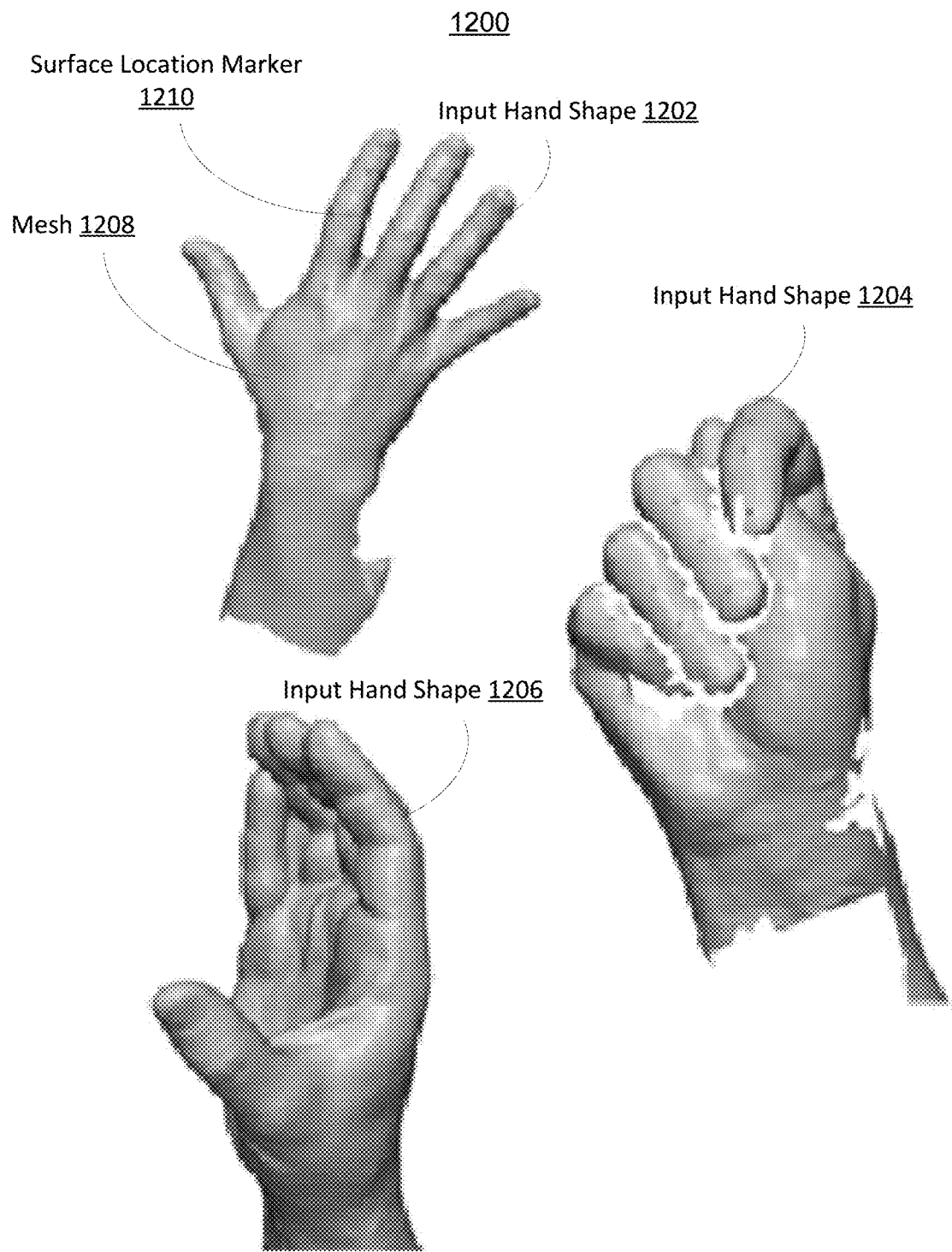
FIG. 12 is examples of input hand shapes, in accordance with some embodiments.

In some embodiments, surface location markers may be used to generate an input hand shape from an image data set. Examples of image data including surface location markers are shown in FIGS. 10 and 11, and discussed below. Examples of input hand shapes are shown in FIG. 12, and also discussed below. The hand tracking controller 502 may be configured to determine corresponding surface location markers across two or more images of an image data set, and use the corresponding surface location markers as references for determining other corresponding pixels of the hand across images of the image data set. To generate the input hand shape, distinct pixels or locations (e.g., defined by one or more pixels) of the hand in the image data are mapped to vertices of the input hand shape. In some embodiments, different surface location markers may have different colors, shapes, sizes, etc. on the surface of the hand to facilitate identification of surface location markers from each other. In some embodiments, the surface location markers may include structured light emitted from depth cameras. The depth image data includes depth information for each pixel, and thus can be used to facilitate pixel correspondence.

The HMD system 100 (e.g., the hand tracking controller 502) determines 930 a base hand shape model defining hand features and associated degrees of freedom for the hand features. As discussed above, a hand shape model may include a skeleton and a mesh. The skeleton includes interconnected hand features that include one or more degrees of freedom. The hand features may represent joints, and the degrees of freedom represent the range of motion of the joints. The mesh includes vertices attached to the skeleton that defines the surface of the hand. Thus, a hand shape model defines the size and shape of a hand, and the possible poses of the hand.

The base hand shape model refers to a default or baseline hand shape model which is manipulated or transformed to generate the customized user hand shape model. The base hand shape model defines the hand features and associated degrees of freedom for the hand features. The base hand shape model may further include a base size and base shape, as defined by a base mesh formed of vertices and the baseline relative locations of hand features. The size and shape of a hand shape model is defined by the skeleton (e.g., size of fixed hand edges between hand features) and the mesh (e.g., exterior shape). In some embodiments, the base hand shape model is a hand shape model is an average hand shape across multiple users, or a common hand shape.

The HMD system 100 (e.g., the hand tracking controller 502) updates 940 the base hand shape model based on fitting vertices of the base hand shape model to corresponding vertices of the input hand shapes. The input hand shapes include the user's hand in different poses. The hand tracking controller 502 is configured to manipulate the base hand shape model using the degrees of freedom for the hand features to fit vertices of the manipulated base hand shape model to corresponding vertices of an input hand shape. The degrees of freedom may define the orientations of joints represented by the hand features, and the relative locations of the hand features.

In some embodiments, fitting vertices of the base hand shape model to corresponding vertices of the input hand shapes includes solving a least squares optimization using a QR factorization. For example, a least square optimization can be performed using an Equation 1:

$$Ax \approx b \qquad (1)$$

where A is a matrix representing the vertices of base hand shape models, b is a matrix representing the vertices of input hand shapes, and x is a matrix represents a state of the model skeleton that make the vertices of the base hand shape model A best fit the vertices of the input hand shapes b. The state of the skeleton may include a parameter for each degree of freedom of each hand feature, and parameters defining relative location of the hand features. Put another way, the matrix x defines a best shape update to the base hand shape model based on each of the input hand shapes.

The solution for x that best solves Equation 1 may be given by Equation 2:

$$x = (A^T A)^{-1} A^T b \qquad (2)$$

where $A^T$ is the transpose of the matrix A. If QR decomposition is used with the least squares optimization, then the matrix A can be defined by Equation 3:

$$A = QR \qquad (3)$$

where Q is an orthogonal matrix, and R is an upper triangular matrix. The matrix Q can be computed implicitly using Householder reflections. The parameters for each Householder reflection is applied to the input hand shapes b directly rather than using a full Q matrix to preserve sparsity (e.g., Q is generally fully dense). In other examples, a Gram-Schmidt, sparse Cholesky, or an iterative method like conjugate gradients may be used to compute the matrix Q. The matrix R can be solved based on the matrix A and Q.

Applying Equation 3 to Equation 2 results in Equation 4:

$$x = (R)^{-1} Q^T b \qquad (4).$$

As such, fitting vertices of the base hand shape model to corresponding vertices of the input hand shapes reduces the average distance between the input meshes and the fitted hand shape model. In some embodiments, an iterative closest points step is performed at each step of the solve where that alternates between two steps: (1) compute correspondences between the fitted hand shape model and the input meshes; and (2) minimize the L2 norm of these correspondences. We also at every step of the solve use a Laplace solver to compute a smooth deformation field that brings the two meshes closer to get more accurate correspondences.

In some embodiments, surface location markers may be used to fit vertices of the base hand shape model to corresponding vertices of the input hand shapes. For example the hand tracking controller 502 may be configured to determine corresponding surface location markers across the input hand shapes. The surface location markers may be inserted in corresponding locations across the input hand shapes. In another example, the hand tracking controller 502 may be configured to detect the surface location markers on the user's hands from the image data sets. As discussed above, these surface location markers may be placed on the user's hand prior to capture by the imaging devices 300, or may be subsequently inserted into the image data sets.

The hand tracking controller 502 may be further configured to determine marker vertices of the base hand shape model that correspond with the corresponding surface location markers across the input hand shapes. The marker vertices refer to vertices of a hand shape model that are associated with vertices of the input hand shapes. For example, the surface location marker 1210 of the input hand shape 1200 shown in FIG. 12 is associated with marker vertices 1304 of the hand shape model 1300 shown in FIG. 13. In some embodiments, at least a portion of the surface markers may be associated with locations of hand features to further facilitate the identification of hand feature locations of the hand shape model from input hand shapes.

The hand tracking controller 502 may be further configured to fit the vertices of the base hand shape model to the corresponding vertices of the input hand shapes based on referencing the marker vertices and the corresponding surface location markers across the input hand shapes. The association of marker vertices and surface location markers are used as reliable reference points to facilitate the identification of correspondence between each vertex of the base hand shape model and that locations on the input hand shapes.

The HMD system 100 (e.g., the hand tracking controller 502) determines 950 a user hand shape model based on the updated base hand shape model. The hand tracking controller 502 generates the user hand shape model to be a best fit for the image data sets.

In some embodiments, the hand tracking controller 502 continues to update and refine the user hand shape model with additional image data sets. The base hand shape model as discussed in process 900 may be a user hand shape model that was previously generated with a first collection of image data sets, and is further refined with additional image data sets. Process 900 may thus be repeated, such as with different image data sets of the user's hand in different poses. Process 900 is described for a single user, but may be repeated for many different users of different hand shapes and sizes, such as to generate a set of principal component hand shape models from a collection of user hand shape models.

FIG. 10 is an example of image data 1000 including surface location markers, in accordance with some embodiments. The image data 1000 is a color image from an RGB imaging device 135. The image data 1000 includes an image of user's hand including surface location markers 1002 that are placed on the user's hand prior to capture by the imaging device 135. Depending on the position of multiple imaging devices 300 and the pose/location of the user's hand, a surface location marker may be visible to multiple imaging devices 300. While FIG. 10 shows a single hand pose, the image data including surface location markers may include the user's hand in one or more other hand poses.

FIG. 11 is an example of image data 1100 including surface location markers, in accordance with some embodiments. The image data 1100 includes image data 1102 and image data 1104 captured from two RGB imaging devices 135. The image data 1100 may be a portion of a full image data set. The surface location markers 1106 are inserted on the image data 1100 rather than being placed on the user's hand. The insertion may be completed manually, or a programmatic machine recognition technique may be used to place the surface location markers 1106.

FIG. 12 shows examples of input hand shapes 1200, in accordance with some embodiments. The input hand shapes 1200 include input hand shape 1202, 1204, and 1206. Each input hand shape 1200 is constructed from an image data set, such as an image data set including image data 1000 shown in FIG. 10 for the input hand shape 1202. The input hand shape 1202 includes a mesh 1208 defining the exterior surface of the input hand shape 1202. The mesh 1208 may be defined by vertices or points. Unlike a hand shape model, the input hand shape is not a deformable model. For example, and input hand shape may be only a surface of the user's hand in a particular pose, and does not include a skeleton, head features, or properties of hand features such as relative location, degrees of freedom, etc. Multiple input hand shapes 1200 may be constructed from different image data sets (e.g., of the user's hand in different poses), and the input hand shapes used to generate an accurate user hand shape model that best fits the input hand shapes. In some embodiments, the input hand shapes may include surface location markers, such as surface location marker 1210 of the input hand shape 1202. The surface location marker 1210 is on the index finger of the mesh 1208, corresponding with the surface location marker 1002 of the image data 1000.

Figure 13:
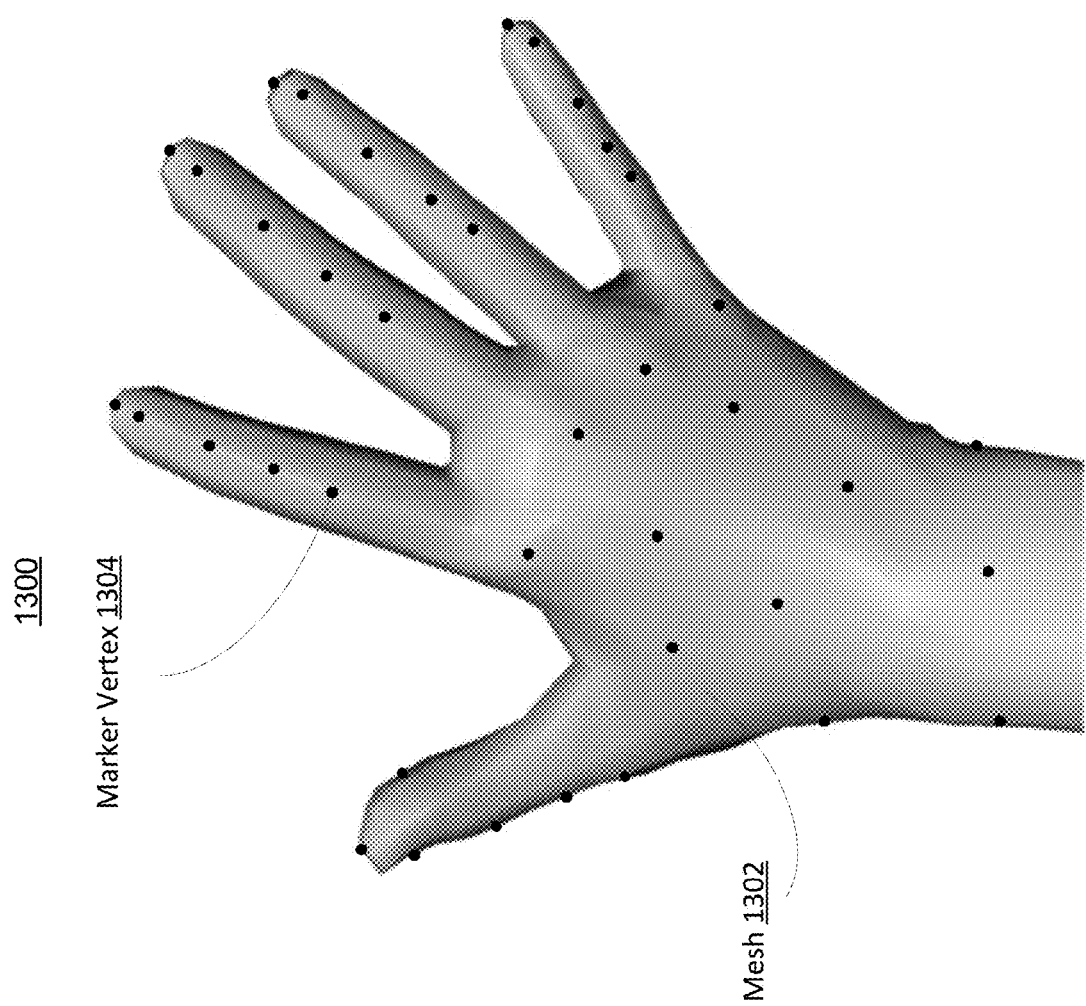
FIG. 13 is an example of a user hand shape model, in accordance with some embodiments.

FIG. 13 is an example of a user hand shape model 1300, in accordance with some embodiments. The user hand shape model 1300 includes a mesh 1302 covering a skeleton. An example skeleton is shown in FIG. 6, and is not shown in FIG. 13 to avoid overcomplicating the drawing. The hand shape model 1300 may further include marker vertices defined on the surface of the mesh 1302, such as marker vertices 1304. Pixels associated with the surface location markers of the input hand shapes are matched to the marker vertices 1304 of the hand shape model 1300, and these matches are used as reference points for matching the unmarked pixels and vertices.

Hand Tracking Using Single Depth Camera and Neural Network

FIG. 14 is a flow chart illustrating a process 1400 for user hand tracking, in accordance with some embodiments. Process 1400 is described as being performed by the HMD system 100, such as the hand tracking controller 502 of the hand tracking unit 160 of the console 110. In some embodiments, the hand tracking unit 160 is located at the HMD 105. In other embodiments, the hand tracking unit 802 of the central system 730 performs portions of the process 1400. Likewise, embodiments may include different and/or additional steps, or perform the steps in different orders. The process 1400 may be performed after a user hand shape model has been generated to determine the pose of the user's hand from depth image data captured by a single depth camera.

The HMD system 100 (e.g., the hand tracking controller 502) receives 1410 depth image data describing a portion of a user's hand from the single depth camera. Depth image data, as shown above in FIG. 2 for depth image data 200 defines a depth map of the user's hand. The imaging device 400 in FIG. 400 is an example of a single depth camera that generates depth image data, and provides the depth image data to the hand tracking controller 502.

The HMD system 100 (e.g., the hand tracking controller 502) determines 1420 a user hand shape model of the user's hand defining degrees of freedom for hand features. The degrees of freedom may include, for example, orientations of hand features and relative locations of the hand features. The hand tracking controller 502 may reference the user hand shape model stored in user hand model store 504. With reference to FIG. 6, the user hand shape model 600 includes hand features 606, each with predefined degrees of freedom. A portion of the hand features 606 may also include relative location parameters, as defined by the hand edges 608. The hand features 606 may define a skeleton 602. The user hand shape model 600 further includes a hand mesh 604 formed of vertices. As such, the user hand shape model is deformable and defines the shape of the user's hand in different poses. The user hand shape model may be previously generated in a calibration of the user's hands, such as by using multiple imaging devices as discussed above in process 900, or by using a single depth camera and principal component hand shape models as discussed below in process 1700.

The HMD system 100 (e.g., the hand tracking controller 502) determines 1430, based on applying the depth image data to a neural network model, heat maps indication locations of the hand features of the hand shape model. The neural network model may include a convolutional neural network model trained by a convolutional neural network. The neural network model defines an algorithmic relationship between the single depth image data and the locations of the hand features of a hand shape model.

Figure 15A:
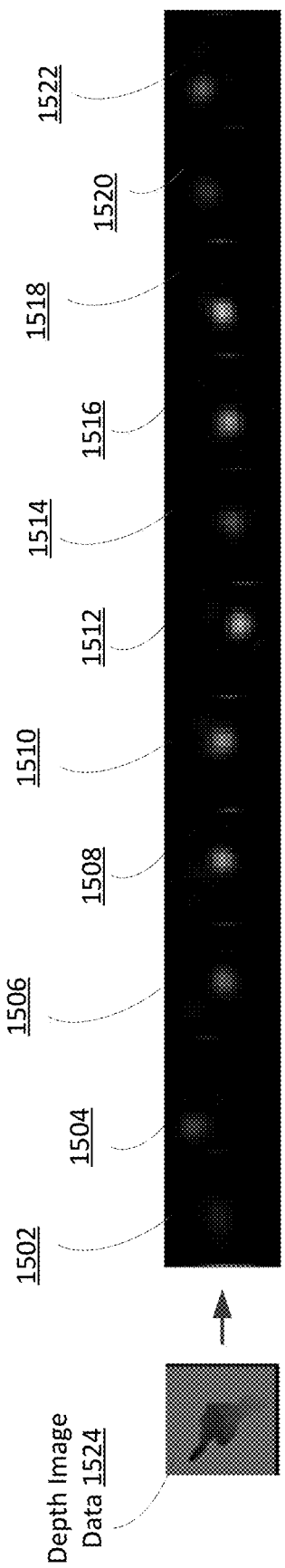
FIG. 15A shows an example of heat maps, in accordance with some embodiments.
Figure 15B:
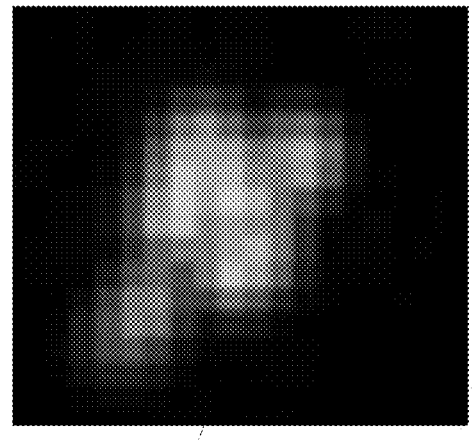
FIG. 15B shows an example of a combined heat map, in accordance with some embodiments.

A heat map defines probabilistic locations of a hand feature. The hand tracking controller 502 may be configured to generate an array or set of heat maps, where each heat map is dedicated to a particular hand feature 606 of the user hand shape model 600. Example heat maps are shown in FIGS. 15A and 15B, and discussed in greater detail below.

The HMD system 100 (e.g., the hand tracking controller 502) determines 1440 a pose of the user's hand based on fitting the locations of the hand features indicated by the heat maps to the user hand shape model. For example, the pose may be defined by a state of the user hand shape model that is a best fit for the probable locations of hand features defined by the heat maps. Different states or poses may be defined by different values for the degrees of freedom of the hand features.

The HMD system 100 (e.g., the hand tracking controller 502 and/or console 110) determines 1450 a user input based on the pose of the user's hand. For example, a pose or sequence of poses may be associated with a particular user input for an application executing on the console 110. The console 110 may be configured to update or modify the application based on the user input.

The HMD system 100 (e.g., console 110) renders 1460 an image of the user's hand based on the hand pose and the user hand shape model. The image of the user's hand generated from the user hand shape model reflects the size and shape of the user's hand, and also the pose of the user's hand. The image may be provided to the electronic display 115 of the HMD 105 for presentation to the user. As such, the user may be presented a detailed representation of the user's hand shape and pose while the HMD 105 is worn on the user's head.

Process 1400 may be repeated, such as while an application that uses hand poses as user input is executing on the console 110. The HMD system, 100 continues to receive depth image data from a single depth camera, generating heat maps, and determining poses of the user's hand by fitting the heat maps to the user hand shape model of the user.

FIG. 15A shows an example of heat maps, in accordance with some embodiments. Heat maps 1502, 1504, 1506, 1508, 1510, 1512, 1514, 1516, 1518, 1520, and 1522 may be output from a convolutional neural network based on input depth image data 1524. Each heat map 1502-1522 includes points on a background, with each point representing a probable location of a hand feature in space. FIG. 15B shows a combined heat map 1526, where the points representing hand feature locations on the heat maps 1502-1522 are superimposed on the same background. Although shown in FIGS. 15A and 15B as points on a two-dimensional image, the points of a heat map may be defined in three-dimensional space (e.g., X, Y, and Z coordinate locations). As such, the set of heat maps 1502-1522 indicate the most probable location in space for each hand feature of a user hand shape model as determined by using the neural network model.

Neural Network Training for Hand Feature Identification

FIG. 16 is a flow chart illustrating a process 1600 for generating a neural network model, in accordance with some embodiments. Process 1600 is described as being performed by the system 700, such as the hand tracking controller 804 of the hand tracking unit 802 of the central system 730. In other embodiments, the hand tracking unit 160 at the HMD 105 or console 110 performs process 1600. Likewise, embodiments may include different and/or additional steps, or perform the steps in different orders.

The system 700 (e.g., the hand tracking controller 804) determines 1610 hand features of a hand shape model. As discussed above, a hand shape model includes predefined hand features, and parameters of the hand features such as degrees of freedom and associated value ranges for the degrees of freedom.

The system 700 (e.g., the hand tracking controller 804) determines 1620 locations of the hand features from image data sets received from imaging devices, each image data set including a pose of the user's hand from multiple perspectives captured by the imaging devices. The image data sets may be captured by a multi-camera imaging system 300, e.g., the imaging devices 302-310, each pointed at a hand capture region 312 from a different direction to capture image data of the user's hand from multiple perspectives. The image data sets may include color image data, or may include depth image data.

The system 700 (e.g., the hand tracking controller 804) generates 1630 first training data including the image data sets and the locations of hand features. The first training data is used to train a neural network and generate the neural network model. The locations of hand features in the image data sets represent ground truth neural network outputs for input image data.

The hand tracking controller 804 may collect the first training data from multiple users. The users may include users of different hand sizes and shapes. The image data sets may include images of hands in different poses. Using a large and representative sample of different hand shapes and poses for training data results in a neural network model that is capable of flexibly handling different types of users.

The locations of hand features for the image data sets may be determined manually, and/or using an automated process. In some embodiments, surface location markers are inserted within the image data sets at locations corresponding with hand features. In another example, surface location markers may be placed on the user's hand, or a glove worn by the user. The surface location markers are captured by the image data sets, and used to facilitate programmatic recognition of hand features and locations of the hand features.

The system 700 (e.g., the hand tracking controller 804) trains 1640 a neural network with the first training data to generate a neural network model. The neural network model defines an algorithmic relationship between image data and the locations of the hand features. The neural network may include a convolutional neural network. The convolutional neural network takes a normalized depth map of the user's hand at different scales, and performs a set of convolutions, max pooling, and nonlinear transformation to output the heat maps of hand feature locations.

Some example neural network architectures may include a deep residual network, an inception-esque neural network, or an upsampling neural network. The deep residual network refers includes multiple deeply stacked layers of nodes, with residual skip connections across layers to propagate gradients. The inception-esque neural network includes deep and wide layers of nodes, with numerous 1×1 reductions to reduce computations. The upsampling neural network includes upsample convolutional lairs and reuses low level features for better localization.

The system 700 (e.g., the hand tracking controller 804) may be configured to initialize a convolutional neural network, and perform a forward pass using the first training data. The forward pass includes generating heat map outputs, and determining an error values (e.g., using root mean square (RMS) error) between ground truth outputs as defined by the first training data and the heat maps output by the neural network. After determining the error values, a backward pass is performed to update the neural network model to cause the heat map outputs to be closer to the ground truth outputs. The backward pass may include performing a gradient descent to update weights of the neural network model to minimize an error function.

In steps 1610-1640, the neural network model is trained using image data sets from multiple perspectives. In steps 1650-1670, the neural network model is updated with single depth image data from single depth cameras.

The system 700 (e.g., the hand tracking controller 804) determines 1650 determines locations of hand features from single depth image data received from a single depth camera. The determination of hand locations may be performed programmatically (e.g., using surface location markers), or inserted into the single depth image data.

The system 700 (e.g., the hand tracking controller 804) generates second training data including the single depth image data and the locations of hand features. The locations of hand features serve as ground truth outputs for training the neural network model.

The system 700 (e.g., the hand tracking controller 804) trains the neural network with the second training data to update the neural network model. The hand tracking controller 804 performs a forward and backward passes as discussed above.

In some embodiments, steps 1610-1640 are performed using the training data collected across multiple users. A base or default neural network model is generated that is capable of handling variances across users. In steps 1650-1670, the neural network model is further updated with a single user's depth image data to refine the neural network model for a particular user.

User Hand Shape Model Using Principal Component Hand Shapes

FIG. 17 is a flow chart illustrating a process 1700 for generating a user hand shape model, in accordance with some embodiments. Process 1700 provides for a calibration of a user's hands to generate a user hand shape model as a combination of a set of principle component hand shape models, such as ten principle component hand shape models. The use of a limited number of principle component hand shape models reduces determination of user hand shape to a smaller number of variables, and thus provides for a fast determination of the user hand shape model. Process 1700 may be performed in a calibration step to generate a user hand shape model for a user by the HMD system 100. Process 1700 is described as being performed by the HMD system 100, such as the hand tracking controller 502 of the hand tracking unit 160 of the console 110. Other entities may perform some or all of the steps of the process in other embodiments. Likewise, embodiments may include different and/or additional steps, or perform the steps in different orders.

The HMD system 100 (e.g., the single camera imaging system 400 including a single depth camera 402) generates 1710 single depth image data including a user's hand. The single depth camera 402 is an imaging device 135 of the HMD system 100. The single depth camera may generate depth image data of the user's hand over time.

The HMD system 100 (e.g., the hand tracking controller 502) determines 1720, based on applying the single depth image data to a neural network model, heat maps indicating locations of hand features of a hand shape model. The neural network model may be trained with training data sets that include depth image data and ground truth hand feature location labels. The discussion above, such as at 1430 of process 1400, may be applicable at 1720.

The HMD system 100 (e.g., the hand tracking controller 502) determines 1730, a hand pose based on the location of the hand features. The heat maps define predicated locations of the hand features in 3-dimensional (3D) space. The hand pose may be defined as a particular state of the skeleton of the hand shape model. The skeleton includes hand features with predefined constraints with respect to relative locations and degrees of freedom, and thus can be reconstructed from the location of hand features as indicated by heat maps. The discussion above, such as at 1440 of process 1400, may be applicable at 1720.

Figure 18:
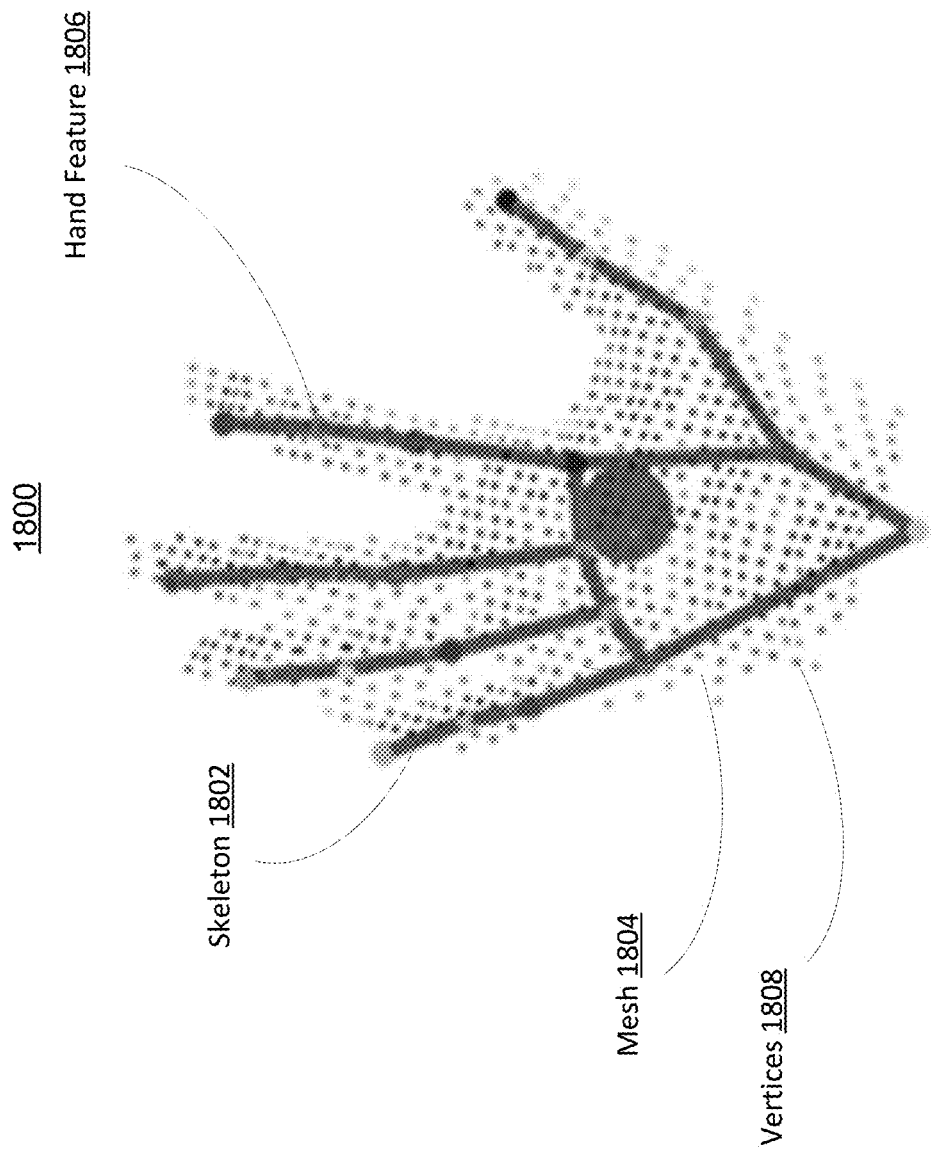
FIG. 18 shows an example input hand shape model, in accordance with some embodiments.

The HMD system 100 (e.g., the hand tracking controller 502) determines 1740 an input hand shape model based on the hand pose. The input hand shape model includes a skeleton and a mesh defined by vertices. A rest skeletal structure may be determined based on the hand pose, and the vertices of the input hand shape model may be determined based on the rest skeletal structure. The distances between each vertex of the mesh and the hand features may be predefined, and thus the vertices of the mesh may be calculated based on the location of the hand features of the rest skeletal structure. An example input hand shape model is shown in FIG. 18 and discussed in greater detail below.

At 1710-1740, an input hand shape model for a pose captured by single depth image data is generated. The HMD system 100 may generate multiple input hand shape models from multiple instances of single depth image data. For example, a depth camera may capture the user's hands over time in a calibration process. The user may be instructed by the HMD 105 to make different hand poses to generate a representative set of input hand shape models. At 1750 and 1760, a user hand shape model is generated from input hand shape models based fitting one or more input hand shape models to a set of principle component hand shape models.

The HMD system 100 (e.g., the hand tracking controller 502) determines 1750 a set of principle component hand shape models. The principle component hand shapes models are orthogonal with respect to each other such that the set of principle component hand shape models defines a hand shape variation space. In some embodiments, the set of principle component hand shape models may be generated by using a representative set of user hand shape models, and applying singular value decomposition (SVD) principle component analysis (PCA) using Jacobi iterations to the set of user hand shape models. In some embodiments, the SVD iterations may include a Gram-Schmidt Process. Generating the set of principle component hand shape models may include calculating multiple user hand shape models, generating an average user hand shape model from the multiple user hand shape models, subtracting the average user hand shape model from the user hand shape models to form a set, and applying a PCA to compute a low-dimensional basis that captures the majority of the variability in the set. Examples of principle component hand shape models are shown in FIG. 19 and discussed in greater detail below.

In some embodiments, representative set of user hand shape models may include user hand shape models generated from image data sets captured by multiple imaging devices as discussed above in process 900. Put another way, process 900 may be performed to generate a set of detailed user hand shape models from multiple imaging devices. The set of user hand shape models may then be used to determine the set of principle component hand shape models.

The HMD system 100 (e.g., the hand tracking controller 502) determines 1760 a user hand shape model based on fitting one or more input hand shape models to the set of principle component hand shape models. The user hand shape model may be represented as a combination of the set of principle component hand shape models, such as a weighted linear combination of the set of principle component hand shape models. In some embodiments, fitting an input hand shape model to the set of principle component hand shape models includes determining principle hand meshes of the set principle component hand shape models, mapping vertices of the input hand shape model to vertices of the principle hand meshes, determine error values between the vertices of the input hand shape model and the vertices of the principle hand meshes; and determining the user hand shape model as a combination of the principle component hand shape models that minimizes the error values between the vertices of the input hand shape model to the vertices of the principle hand meshes.

In some embodiments, mapping vertices of the input hand shape model to vertices of the principle hand meshes may include applying a procrustes transformation. The procrustes transformation translates, rotates, and/or scales the input hand shape model into a baseline (e.g., rest) pose of the principle component hand shape models. The mesh of the user hand shape model is adjusted with changes in the vertices of the input hand shape when fitted to the principle hand meshes. A neural network is applied to determine the locations of hand features that simplify the calculation.

Process 1700 limits the number of ways that a user hand shape model can vary when being fit to image data (e.g., compared with process 900), and thus provides a fast calibration for the user hand model of a user using a single depth camera. For example, using a set of ten principle component hand component models lowers the degrees of freedom (e.g., to 10) for user hand shape models. This simplifies calculations and speeds up calibration of the user's hand.

FIG. 18 shows an example input hand shape model 1800, in accordance with some embodiments. The input hand shape model 1800 includes a skeleton 1802 and a mesh 1804. The skeleton 1802 includes hand features 1806. The locations of the hand features 1806 are determined based on heat maps output from the neural network. The vertices 1808 of the mesh 1804 are defined with respect one or more points on the skeleton 1802, such as one or more hand features 1806. A procrustes transformation may be used to translate, rotate, and/or scale the input hand shape model 1800 into a baseline (e.g., rest) pose from the hand pose captured in the depth image data.

FIG. 19 shows examples of principle component hand shape models 1900, in accordance with some embodiments. Each user hand shape model may be defined as a weighted linear combination of the set of principle component hand shape models. For example, a user hand shape model may be defined by weighting principle component hand shape model 1902 by $w_0$, weighting principle component hand shape model 1904 by $w_1$, weighting principle component hand shape model 1906 by $w_2$, and so forth for each of the principle component hand shape models of the set of principle component hand shape models. Each principle component hand shape model defines a dimension or way that a hand shape can vary. For example, one principle component hand shape may control the overall size of the hand, a second principle component hand shape may control lengths of fingers (e.g., making the thumb longer and the pinky shorter, etc.), and a third principle component hand shape may control palm width (e.g., wider or skinnier). In some embodiments, the set includes a predefined number of principle component hand shape models, such as ten principle component hand shape models. The weighted principle component hand shape models are then summed to define the user hand shape model.

Additional Configuration Considerations

The foregoing descriptions of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    a single depth camera configured to generate single depth image data of a user's hand;
    a circuitry configured to:
        receive the single depth image data of the user's hand from the single depth camera;
        determine, based on applying the single depth image data to a neural network model, heat maps indicating locations of hand features;
        determine a hand pose based on the locations of the hand features;
        determine an input hand shape model based on the hand pose;
        determine a set of principal component hand shape models, the principal component hand shape models defining orthogonal dimensions of hand size variance with respect to each other such that the set of principal component hand shape models defines a hand size variation space;
        determine a user hand shape model based on fitting the input hand shape model to the set of principal component hand shape models; and
        render an image of the user's hand based on the user hand shape model; and
    a display device configured to present the rendered image to the user.

2. The system of claim 1, wherein the user hand shape model includes a combination of the set of principal component hand shape models.

3. The system of claim 2, wherein the circuitry configured to determine the user hand shape model based on fitting the input hand shape model to the set of principal component hand shape models includes the circuitry being configured to:
    determine principal hand meshes of the set principal component hand shape models;
    map vertices of the input hand shape model to vertices of the principal hand meshes;
    determine error values between the vertices of the input hand shape model and the vertices of the principal hand meshes; and
    determine the user hand shape model as a combination of the principal component hand shape models that minimizes the error values between the vertices of the input hand shape model to the vertices of the principal hand meshes.

4. The system of claim 3, wherein the circuitry configured to map the vertices of the input hand shape model to the vertices of the principal hand meshes includes the circuitry being configured to apply a procrustes transformation.

5. The system of claim 1, wherein the circuitry is further configured to:
    receive second single depth image data of the user's hand from the single depth camera;
    determine, based on applying the second single depth image data to the neural network model, second heat maps indicating second locations of the hand features;
    determine a second pose of the user's hand based on fitting the second locations of the hand features to the user hand shape model; and
    determine a user input based on the second pose of the user's hand.

6. The system of claim 1,
    wherein the display device is located in a head-mounted display (HMD).

7. The system of claim 6, wherein the single depth camera is attached to the HMD.

8. The system of claim 1, wherein the circuitry configured to determine a hand pose based on the location of the hand features includes the circuitry being configured to:
    determine degrees of freedom of the hand features; and
    determine values for the degrees of freedom that fit the locations of the hand features.

9. The system of claim 1, wherein the circuitry configured to determine the input hand shape model based on the hand pose includes the circuitry being configured to:
    determine a rest skeletal structure based on the hand pose; and
    determine vertices of the input hand shape model based on the rest skeletal structure.

10. The system of claim 1, wherein the heat maps indicate the predicated locations of the hand features in 3-dimensional (3D) space.

11. The system of claim 1, wherein the circuitry is further configured to:
    determine a plurality of input hand shape models from the single depth image data, the single depth image data including a plurality of poses of the user's hand; and
    determine the user hand shape model based on fitting the plurality of input hand shape models to the set of principal component hand shape models.

12. A device, comprising:
    a circuitry configured to:
        receive single depth image data of a user's hand from a single depth camera, determine, based on applying the single depth image data to a neural network model, heat maps indicating locations of hand features;

determine a hand pose based on the locations of the hand features;

determine an input hand shape model based on the hand pose;

determine a set of principal component hand shape models, the principal component hand shape models defining orthogonal dimensions of hand size variance with respect to each other such that the set of principal component hand shape models defines a hand size variation space;

determine a user hand shape model based on fitting the input hand shape model to the set of principal component hand shape models; and render an image of the user's hand based on the user hand shape model; and a display configured to present the rendered image to the user.

13. The device of claim 12, wherein the user hand shape model includes a combination of the set of principal component hand shape models.

14. The device of claim 12, wherein the circuitry configured to determine the user hand shape model based on fitting the input hand shape model to the set of principal component hand shape models includes the circuitry being configured to:

determine principal hand meshes of the set principal component hand shape models;

map vertices of the input hand shape model to vertices of the principal hand meshes;

determine error values between the vertices of the input hand shape model and the vertices of the principal hand meshes; and determine the user hand shape model as a combination of the principal component hand shape models that minimizes the error values between the vertices of the input hand shape model to the vertices of the principal hand meshes.

15. The device of claim 14, wherein the circuitry configured to map the vertices of the input hand shape model to the vertices of the principal hand meshes includes the circuitry being configured to apply a procrustes transformation.

16. The device of claim 14, wherein the circuitry is further configured to:

receive second single depth image data of the user's hand from the single depth camera;

determine, based on applying the second single depth image data to the neural network model, second heat maps indicating second locations of the hand features;

determine a second pose of the user's hand based on fitting the second locations of the hand features to the user hand shape model; and determine a user input based on the second pose of the user's hand.

17. The device of claim 12, wherein the circuitry configured to determine a hand pose based on the location of the hand features includes the circuitry being configured to:

determine degrees of freedom of the hand features; and determine values for the degrees of freedom that fit the locations of the hand features.

18. The device of claim 12, wherein the circuitry configured to determine the input hand shape model based on the hand pose includes the circuitry being configured to:

determine a rest skeletal structure based on the hand pose; and determine the vertices of the input hand shape model based on the rest skeletal structure.

19. The device of claim 12, wherein the heat maps indicate the predicated locations of the hand features in 3-dimensional (3D) space.

20. The device of claim 12, wherein the circuitry is further configured to:

determine a plurality of input hand shape models from the single depth image data, the single depth image data including a plurality of poses of the user's hand; and determine the user hand shape model based on fitting the plurality of input hand shape models to the set of principal component hand shape models.

21. A head-mounted display (HMD), comprising:

a circuitry configured to:

receive single depth image data of a user's hand from a single depth camera;

determine, based on applying the single depth image data to a neural network model, heat maps indicating locations of hand features;

determine a hand pose based on the locations of the hand features;

determine an input hand shape model based on the hand pose;

determine a set of principal component hand shape models, the principal component hand shape models defining orthogonal dimensions of hand size variance with respect to each other such that the set of principal component hand shape models defines a hand size variation space;

determine a user hand shape model based on fitting the input hand shape model to the set of principal component hand shape models; and render an image of the user's hand based on the user hand shape model; and a display device configured to present the rendered image to the user.

* * * * *

UNITED STATES PATENT AND TRADEMARK OFFICE
CERTIFICATE OF CORRECTION

PATENT NO. : 10,803,616 B1
APPLICATION NO. : 15/487361
DATED : October 13, 2020
INVENTOR(S) : Twigg et al.

Page 1 of 1

It is certified that error appears in the above-identified patent and that said Letters Patent is hereby corrected as shown below:

On the Title Page

In Column 2, under "OTHER PUBLICATIONS", delete "Confernce" and insert -- Conference --, therefor.

In the Claims

In Column 22, Claim 6, Lines 35-36, delete "The system of claim 1,      wherein the display device is located in a head-mounted display (HMD)." and insert
-- The system of claim 1, wherein the display device is located in a head-mounted display (HMD). --, therefor.

In Column 22, Claim 12, Line 67, delete "camera," and insert -- camera; --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*